(12) United States Patent
Andrews

(10) Patent No.: US 11,999,034 B2
(45) Date of Patent: Jun. 4, 2024

(54) SYSTEMS AND METHODS FOR INSERTING AND REMOVING BUSHING ASSEMBLIES

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 17/808,077

(22) Filed: Jun. 21, 2022

(65) Prior Publication Data
US 2023/0142403 A1 May 11, 2023

Related U.S. Application Data

(60) Division of application No. 17/412,826, filed on Aug. 26, 2021, which is a continuation-in-part of
(Continued)

(51) Int. Cl.
| | |
|---|---|
| *B25B 27/06* | (2006.01) |
| *B25B 27/28* | (2006.01) |
| *F16C 43/02* | (2006.01) |

(52) U.S. Cl.
CPC ............ *B25B 27/062* (2013.01); *F16C 43/02* (2013.01); *B25B 27/28* (2013.01)

(58) Field of Classification Search
CPC ......... B25B 11/00; B25B 27/14; B25B 27/02; B25B 27/023; B25B 27/06; B25B 27/062;
(Continued)

(56) References Cited

U.S. PATENT DOCUMENTS

| | | |
|---|---|---|
| 569,527 A | 10/1896 | Tilton |
| 689,154 A | 12/1901 | Bartlett |

(Continued)

FOREIGN PATENT DOCUMENTS

| | | |
|---|---|---|
| AU | 2015200630 B2 | 5/2018 |
| AU | 2015200375 B2 | 7/2019 |

(Continued)

OTHER PUBLICATIONS

Machine translation of DE-10221280-C1 (Year: 2003).*
(Continued)

*Primary Examiner* — Lee D Wilson
*Assistant Examiner* — Robert F Neibaur
(74) *Attorney, Agent, or Firm* — Michael R. Schacht; Schacht Law Office, Inc.

(57) ABSTRACT

A bushing displacing system comprising an engaging member and a brace member. The engaging member is configured to engage the brace assembly to displace the engaging member in the displacement direction and at least a portion of the bushing assembly to displace at least a portion of the bushing assembly in the displacement direction. The brace member is adapted to engage the brace assembly and the structural member. Operation of the actuator displaces at least one of the brace assembly and the engaging member in the displacement direction relative to the structural member such that the engaging member displaces at least a portion of the bushing assembly towards a desired position relative to the housing opening in the structural member.

2 Claims, 22 Drawing Sheets

Related U.S. Application Data application No. 17/199,133, filed on Mar. 11, 2021, now Pat. No. 11,815,132.

(60) Provisional application No. 63/163,627, filed on Mar. 19, 2021, provisional application No. 63/070,759, filed on Aug. 26, 2020, provisional application No. 62/989,537, filed on Mar. 13, 2020.

(58) Field of Classification Search
CPC ... B25B 27/064; B25B 27/0028; B25B 27/28; B23P 15/00; F16C 43/02; Y10T 29/53861; Y10T 29/53848; Y10T 29/538; Y10T 29/5383; Y10T 29/53657; Y10T 29/53796; Y10T 29/53843; Y10T 29/53839; Y10T 29/53852
USPC ...... 29/244, 256, 258, 259, 263, 426.5, 255, 29/278
See application file for complete search history.

(56) References Cited

U.S. PATENT DOCUMENTS

| | | |
|---|---|---|
| 1,131,868 A | 3/1915 | Ridlon |
| 1,155,720 A | 10/1915 | Louis |
| 1,334,658 A | 3/1920 | Koch |
| 1,368,760 A | 2/1921 | Schilling |
| 1,429,567 A | 9/1922 | Carlisle |
| 1,476,983 A | 12/1923 | King |
| 1,498,638 A | 6/1924 | Periolat |
| 1,552,616 A | 9/1925 | Jake |
| 1,650,964 A | 11/1927 | Schmitt |
| 1,682,956 A | 9/1928 | Dawson et al. |
| 1,778,802 A | 10/1930 | Howell |
| 1,817,988 A | 8/1931 | Klamt |
| 1,849,805 A | 3/1932 | Raymond |
| 1,857,211 A | 5/1932 | Odlum et al. |
| 1,990,570 A | 2/1935 | Smith |
| 1,996,967 A | 4/1935 | Kratky |
| 2,036,782 A | 4/1936 | Ullmo |
| 2,052,534 A | 8/1936 | Quarles |
| 2,290,427 A | 7/1942 | Harrington |
| 2,374,861 A | 5/1945 | Graham |
| 2,380,980 A | 8/1945 | Looney |
| 2,427,948 A | 9/1947 | Cornwell |
| 2,484,129 A | 10/1949 | Taylor |
| 2,549,429 A | 4/1951 | Cowles |
| 2,681,501 A | 6/1954 | Albert |
| 2,755,540 A | 7/1956 | Crozier |
| 2,798,392 A | 7/1957 | Randolph |
| 3,102,333 A | 9/1963 | Thornton et al. |
| 3,200,483 A | 8/1965 | Menegoni |
| 3,237,291 A | 3/1966 | Kelso |
| 3,336,652 A | 8/1967 | Andre |
| 3,662,449 A | 5/1972 | Seiichi |
| 3,742,570 A | 7/1973 | Felser |
| 3,862,483 A | 1/1975 | Kloster |
| 3,964,149 A | 6/1976 | Hugh |
| 4,034,458 A | 7/1977 | Ford et al. |
| 4,195,398 A | 4/1980 | Matthews |
| 4,363,475 A | 12/1982 | McCarty |
| 4,398,706 A | 8/1983 | Kaulfuss |
| 4,428,105 A | 1/1984 | Abbott et al. |
| 4,589,180 A | 5/1986 | Vachon |
| 4,624,039 A | 11/1986 | Lawrence et al. |
| 4,648,166 A | 3/1987 | Tilman |
| 4,649,615 A | 3/1987 | Hundley |
| 4,672,731 A | 6/1987 | Taylor |
| 4,691,424 A | 9/1987 | Michael et al. |
| 4,765,057 A | 8/1988 | Muller |
| 4,769,890 A | 9/1988 | Maynard |
| 4,770,401 A | 9/1988 | Donaldson |
| 4,771,528 A | 9/1988 | Stromberg |
| 4,867,366 A | 9/1989 | Kleinholz |
| 4,940,370 A | 7/1990 | Gipson |
| 4,941,252 A | 7/1990 | Haisch et al. |
| 4,976,280 A | 12/1990 | Lagana |
| 4,977,660 A | 12/1990 | Maynard |
| 5,125,324 A | 6/1992 | Araki et al. |
| 5,159,743 A | 11/1992 | Somerville |
| 5,163,665 A | 11/1992 | Klearman |
| 5,174,005 A | 12/1992 | Somerville |
| 5,181,303 A | 1/1993 | Gregg |
| 5,210,919 A | 5/1993 | Garman |
| 5,211,211 A | 5/1993 | Rubino et al. |
| 5,224,254 A | 7/1993 | McPeak et al. |
| 5,233,741 A | 8/1993 | Maynard |
| 5,255,435 A | 10/1993 | Shultz |
| 5,257,445 A | 11/1993 | Mayberry |
| 5,271,136 A | 12/1993 | Skoworodko |
| 5,341,553 A | 8/1994 | Herzhauser |
| 5,419,027 A | 5/1995 | McPeak et al. |
| 5,519,929 A | 5/1996 | Bleckman |
| 5,535,973 A | 7/1996 | Bailey et al. |
| 5,557,833 A | 9/1996 | Pool |
| 5,586,378 A | 12/1996 | Smith |
| 5,606,788 A | 3/1997 | Rubino et al. |
| 5,692,437 A | 12/1997 | Tabain |
| 5,787,561 A | 8/1998 | Harmand |
| 5,839,180 A | 11/1998 | Hochmiller |
| RE36,009 E | 12/1998 | Shultz |
| 5,857,252 A | 1/1999 | Jansen |
| 5,887,328 A | 3/1999 | Rydin et al. |
| 5,893,202 A | 4/1999 | Graham et al. |
| 5,898,985 A | 5/1999 | Villarreal |
| 5,983,474 A | 11/1999 | Koppe |
| 6,192,566 B1 | 2/2001 | Dunum |
| 6,505,390 B2 | 1/2003 | Emanuel |
| 6,574,843 B1 * | 6/2003 | Meadows ............... B25B 27/28 29/267 |
| 6,618,920 B1 | 9/2003 | Emanuel |
| 6,716,218 B2 | 4/2004 | Holmes et al. |
| 6,789,791 B2 | 9/2004 | Genduso |
| 7,003,877 B2 | 2/2006 | Reale |
| 7,020,944 B2 | 4/2006 | Klann |
| 7,093,809 B2 | 8/2006 | Hwang |
| 7,117,573 B1 | 10/2006 | Hu |
| 7,213,317 B2 | 5/2007 | Hu |
| 7,219,885 B2 | 5/2007 | Nardozza |
| 7,387,296 B2 | 6/2008 | Alberti |
| 7,475,465 B1 | 1/2009 | Weiss |
| 7,520,041 B1 | 4/2009 | Aguilar |
| 7,669,305 B1 | 3/2010 | Lionberg |
| 7,669,306 B2 | 3/2010 | Palka |
| 7,685,688 B2 | 3/2010 | Fan |
| 7,707,709 B2 | 5/2010 | Whitehead |
| 7,717,573 B2 | 5/2010 | Matsubara et al. |
| 7,818,860 B2 | 10/2010 | Hume et al. |
| 7,890,305 B2 | 2/2011 | Lionberg |
| 7,891,084 B1 | 2/2011 | Sollami |
| 7,895,723 B2 | 3/2011 | Wridt et al. |
| 7,918,003 B2 | 4/2011 | Acciardo, Jr. |
| 7,996,972 B2 | 8/2011 | Hu |
| 8,387,252 B1 | 3/2013 | Johnson et al. |
| 8,567,292 B1 | 10/2013 | Park et al. |
| 8,627,557 B2 | 1/2014 | Jansen et al. |
| 8,689,420 B2 | 4/2014 | Barrios et al. |
| 8,745,832 B2 | 6/2014 | Barrios et al. |
| 9,107,719 B2 | 8/2015 | Gauthier |
| 9,511,488 B2 | 12/2016 | Andrews et al. |
| 9,718,177 B1 | 8/2017 | Bell |
| 9,751,199 B2 | 9/2017 | Andrews |
| 9,808,922 B2 | 11/2017 | Breschi et al. |
| 9,908,208 B2 | 3/2018 | Andrews |
| 10,005,175 B2 | 6/2018 | Morris |
| 10,265,839 B1 | 4/2019 | Hunter |
| 10,307,901 B2 | 6/2019 | Andrews |
| 10,486,293 B2 * | 11/2019 | Verkley ............... E21C 35/188 |
| 10,583,546 B2 | 3/2020 | Yang |
| 10,744,627 B2 | 8/2020 | Andrews |
| 10,906,140 B2 | 2/2021 | Andrews |
| 10,987,788 B2 | 4/2021 | Andrews |
| 11,090,788 B2 | 8/2021 | Huang |
| 11,285,583 B2 * | 3/2022 | Stuart ............... B25B 23/0035 |

(56) References Cited

U.S. PATENT DOCUMENTS

| | | |
|---|---|---|
| 2001/0029655 A1 | 10/2001 | Emanuel |
| 2002/0095759 A1 | 7/2002 | Scott |
| 2003/0033909 A1 | 2/2003 | Gore |
| 2003/0084555 A1 | 5/2003 | Meggiolan |
| 2003/0106197 A1 | 6/2003 | Emanuel |
| 2005/0071973 A1 | 4/2005 | Emanuel |
| 2006/0037184 A1 | 2/2006 | Miller |
| 2006/0070221 A1 | 4/2006 | Wridt et al. |
| 2006/0162509 A1 | 7/2006 | Wang |
| 2007/0251076 A1 | 11/2007 | Zhong et al. |
| 2008/0289841 A1 | 11/2008 | Kang |
| 2009/0025514 A1 | 1/2009 | Barrios et al. |
| 2009/0211094 A1 | 8/2009 | Adelman |
| 2010/0000749 A1 | 1/2010 | Andel |
| 2010/0236039 A1 | 9/2010 | Robledo |
| 2010/0251528 A1 | 10/2010 | Hu |
| 2010/0281665 A1 | 11/2010 | Punaro |
| 2010/0283193 A1 | 11/2010 | Huang |
| 2011/0048649 A1 | 3/2011 | Komatsu et al. |
| 2011/0094076 A1 | 4/2011 | Liu |
| 2011/0219617 A1 | 9/2011 | Barrios et al. |
| 2012/0110815 A1 | 5/2012 | Brown |
| 2012/0272499 A1 | 11/2012 | Schley et al. |
| 2013/0026692 A1 | 1/2013 | Prins |
| 2014/0338166 A1 | 11/2014 | Studney |
| 2014/0345104 A1 | 11/2014 | Andrews et al. |
| 2014/0366954 A1 | 12/2014 | Miller et al. |
| 2015/0183102 A1 | 7/2015 | Breschi et al. |
| 2015/0183268 A1 | 7/2015 | Baldassara et al. |
| 2015/0209918 A1 | 7/2015 | Andrews |
| 2015/0224635 A1 | 8/2015 | Andrews |
| 2017/0209994 A1 | 7/2017 | Hargrove et al. |
| 2017/0297152 A1 | 10/2017 | Andrews |
| 2017/0307020 A1 | 10/2017 | Andrews |
| 2017/0361438 A1 | 12/2017 | Andrews |
| 2018/0207776 A1 | 7/2018 | Andrews |
| 2018/0370002 A1 | 12/2018 | Andrews |
| 2019/0070716 A1 | 3/2019 | Andrews |

FOREIGN PATENT DOCUMENTS

| | | | | |
|---|---|---|---|---|
| AU | 2017248765 B2 | 11/2021 | | |
| CA | 2852069 C | 1/2019 | | |
| CA | 2881390 C | 4/2019 | | |
| CA | 2880139 C | 12/2019 | | |
| CA | 2890557 C | 10/2020 | | |
| CA | 3015834 C | 5/2021 | | |
| DE | 19631524 C1 | 11/1997 | | |
| DE | 20113561 U1 | 11/2001 | | |
| DE | 10221280 C1 | * 8/2003 | ......... | B25B 27/0071 |
| DE | 10221280 C1 | 8/2003 | | |
| EP | 0988937 A2 | 3/2000 | | |
| EP | 2461061 A2 | 6/2012 | | |
| EP | 3423238 A4 | 11/2019 | | |
| EP | 3442751 A4 | 1/2020 | | |
| FR | 2387090 A1 | 11/1978 | | |
| FR | 2670703 A1 | 6/1992 | | |
| JP | 104800 U1 | 9/1974 | | |
| JP | 192877 U1 | 12/1987 | | |
| JP | 4105881 B2 | 6/2008 | | |
| JP | 3160459 U | 6/2010 | | |
| KR | 100746562 B | 8/2007 | | |
| KR | 101746033 B | 6/2017 | | |
| RU | 2028933 C1 | 2/1995 | | |
| SU | 654401 A2 | 3/1979 | | |
| SU | 1207744 A | 1/1986 | | |
| SU | 1384368 A1 | 3/1988 | | |
| SU | 1505740 A1 | 9/1989 | | |
| SU | 1632766 A1 | 3/1991 | | |
| TW | 306377 U | 5/1997 | | |
| TW | 471371 U | 1/2002 | | |
| TW | M342918 U | 10/2008 | | |
| TW | M497081 U | 3/2015 | | |
| WO | 2011012552 A1 | 2/2011 | | |
| WO | 2016065311 A1 | 4/2016 | | |
| WO | 2016063140 A3 | 6/2016 | | |
| WO | 2017151953 A1 | 9/2017 | | |
| WO | 2017181078 A1 | 10/2017 | | |
| WO | 2019050989 A1 | 3/2019 | | |

OTHER PUBLICATIONS

Canadian Intellectual Property Office, "Office Action, Application No. 2,880,139,", dated Jan. 7, 2019, 3 pages.
Greenerd, "Arbor Press History," Website http://www.greenerd.com/about-greenerd/history/default.aspxp. 2, predates Mar. 13, 2020, 5 pages.
International Searching Authority, ISR & Written Opinion, PCT/IB2015/002481, dated May 10, 2017, 6 pages.
International Searching Authority, ISR & Written Opinion, PCT/US2015/057201, dated Dec. 22, 2015, 9 pages.
International Searching Authority, ISR & Written Opinion, PCT/US2017/020496, dated Jun. 1, 2017, 7 pages.
International Searching Authority, ISR & Written Opinion, PCT/US2017/027724, dated Aug. 17, 2017, 7 pages.
International Searching Authority, ISR & Written Opinion, PCT/US2018/049608, dated Dec. 6, 2018, 8 pages.
OTC, "Wheel Stud Remover/Installer," Product Brochure, 2009, 1 page, Product No. 5195.
OTC, "Wheel Stud Service Kit," Product Brochure, 2012, 1 page, Product No. 4295.
Semenov V. M., "Non-standard tool for dismantling and assembly work", Moskva, Izdatelstvo Kolos, (19750000), pp. 200-201, 219, 220, 253, 254, 257.
Toyota, "4Runner Repair Manual, Inspection and Repair of Front Axle Hub" 1990, p. 1 and SA-18, vol. 2, Publication No. RM143U2.
USPTO, "Final Office Action, U.S. Appl. No. 14/616,693," dated May 3, 2017, 10 pages.
Uspto, "Non-Final Office Action, U.S. Appl. No. 15/520,196," dated Apr. 2, 2019, 8 pages.
Wikipedia, "Hydraulic Press," Website http://en.wikipedia.org/wiki/Hydraulic-pressp., predates Mar. 13, 2020, 1.

* cited by examiner

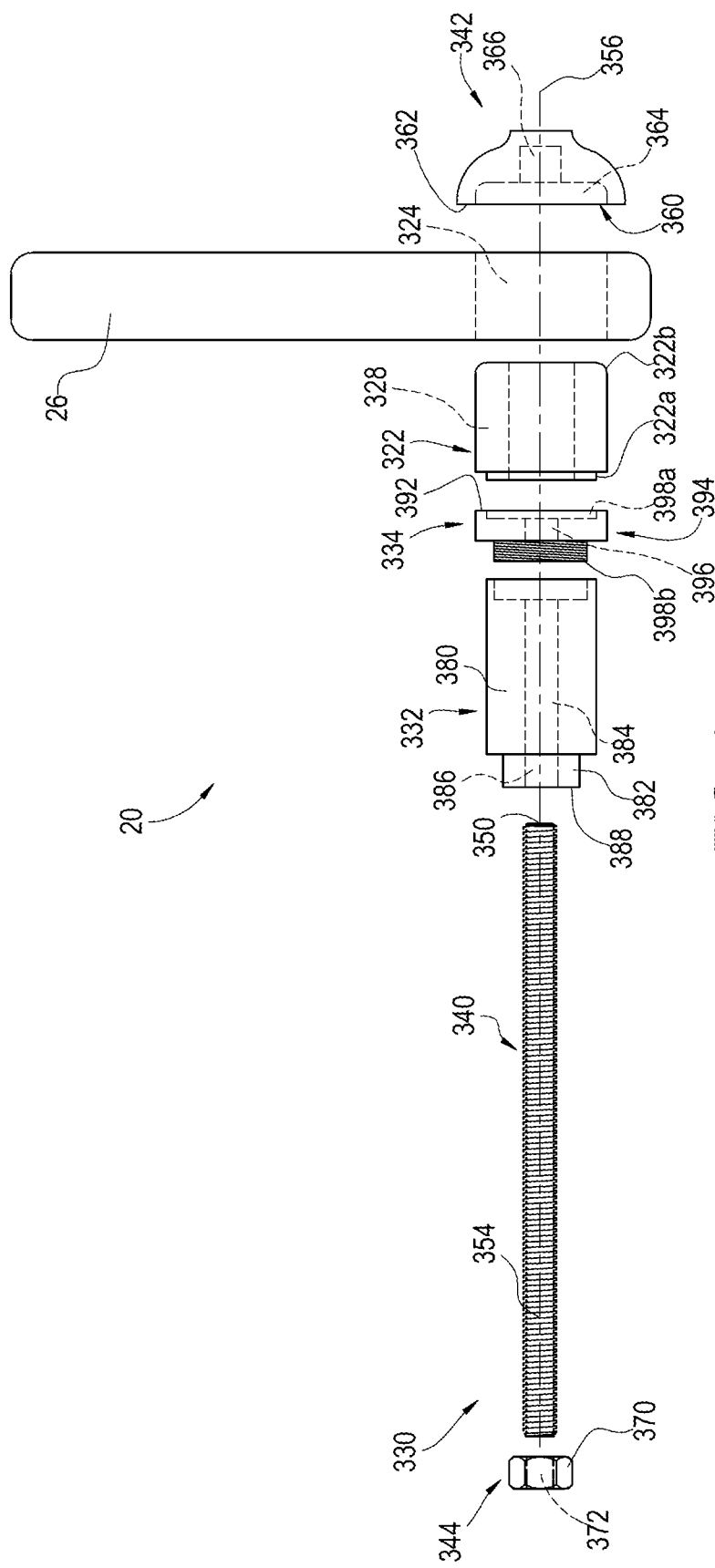

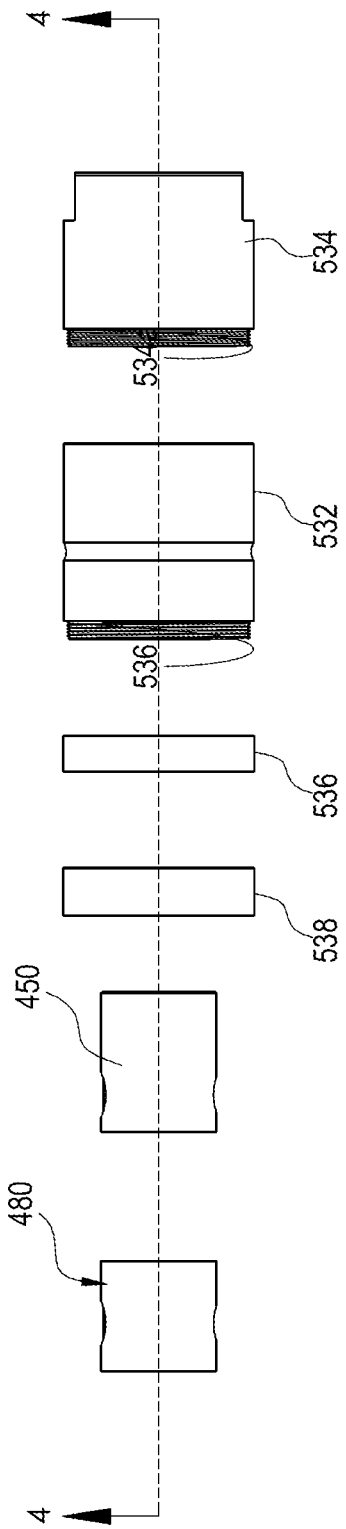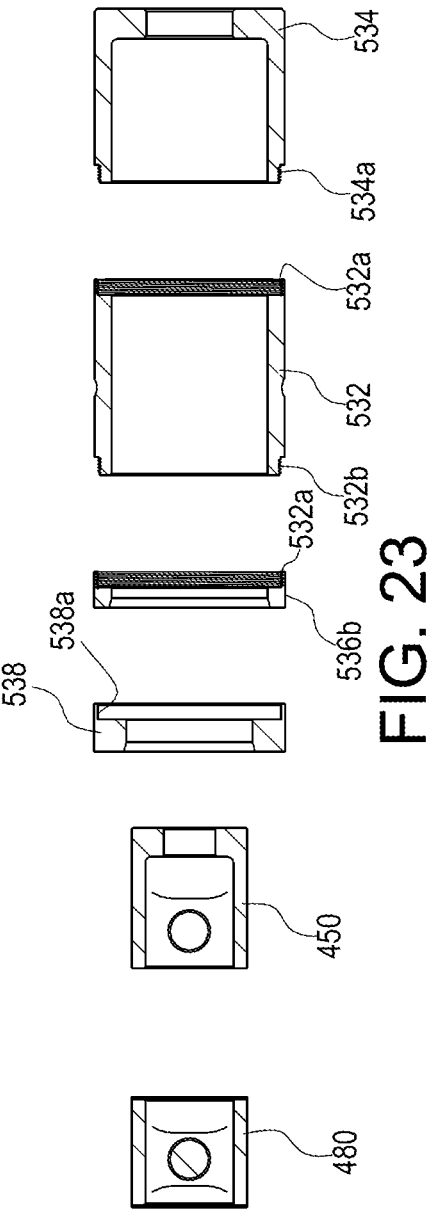

SYSTEMS AND METHODS FOR INSERTING AND REMOVING BUSHING ASSEMBLIES

RELATED APPLICATIONS

This application, U.S. patent application Ser. No. 17/808,077 filed Jun. 21, 2022 is a divisional of U.S. patent application Ser. No. 17/412,826 filed Aug. 26, 2021.

U.S. patent application Ser. No. 17/412,826 claims benefit of U.S. Provisional Application Ser. No. 63/070,759 filed Aug. 26, 2020.

U.S. patent application Ser. No. 17/412,826 also claims benefit of U.S. Provisional Application Ser. No. 63/163,627 filed Mar. 19, 2021.

U.S. patent application Ser. No. 17/412,826 is also a continuation-in-part of U.S. patent application Ser. No. 17/199,133 filed Mar. 11, 2021, currently pending.

U.S. patent application Ser. No. 17/199,133 claims benefit of U.S. Provisional Application Ser. No. 62/989,537 filed Mar. 13, 2020.

The contents of all related applications are incorporated herein by reference.

TECHNICAL FIELD

The present invention relates to tool systems and methods for removing and/or installing bushings into a housing opening defined by a structural member.

BACKGROUND

Bushings are a form of bearing that is used to support a rotating shaft relative to a structural member. Bushings can be removed and replaced when worn or damaged. Typically, a bushing defines an outer diameter sized and dimensioned to be snugly received within the housing opening and an inner diameter sized and dimensioned to snugly receive the rotating shaft.

The present invention relates to the insertion of solid sleeve bushings into a housing opening defined by the structural member.

To replace a worn bushing, the rotating shaft is first removed from the inner opening defined by the worn bushing. The worn bushing is then pressed out of the housing opening. The replacement bushing is then pressed into the housing opening such that the replacement bushing is rigidly supported by the structural member in a desired position relative to the structural member. The rotating shaft is next arranged within the inner opening of the replacement bushing.

The present invention is of particular significance when used as part of the step of inserting and/or removing bushing assemblies and in particular to the insertion and/or removal of a bushing assembly comprising a bushing pin, a bushing sleeve, and elastomeric material supporting the bushing pin within the bushing sleeve, and that application of the present invention will be described herein.

SUMMARY

The present invention may be embodied as a bushing displacing system for displacing a bushing assembly relative to a housing opening in a structural member using an actuator and a brace assembly. So embodied, the bushing displacement system comprises and engaging member and a brace member. The engaging member is configured to engage the brace assembly such that movement of the brace assembly in a displacement direction displaces the engaging member in the displacement direction at least a portion of the bushing assembly such that displacement of the engaging member in the displacement direction displaces at least a portion of the bushing assembly in the displacement direction. The brace member is adapted to engage the brace assembly and the structural member. Operation of the actuator displaces at least one of the brace assembly and the engaging member in the displacement direction relative to the structural member such that the engaging member displaces at least a portion of the bushing assembly towards a desired position relative to the housing opening in the structural member.

The present invention may also be embodied as a method for displacing a bushing assembly relative to a housing opening in a structural member using an actuator and a brace assembly comprising the following steps. An engaging member is configured to engage the brace assembly such that movement of the brace assembly in a displacement direction displaces the engaging member in the displacement direction and at least a portion of the bushing assembly such that displacement of the engaging member in the displacement direction displaces at least a portion of the bushing assembly in the displacement direction. A brace member is arranged to engage the brace assembly and the structural member. The actuator is operated to displace at least one of the brace assembly and the engaging member in the displacement direction relative to the structural member such that the engaging member displaces at least a portion of the bushing assembly towards a desired position relative to the housing opening in the structural member.

The present invention may also be embodied as a method of displacing a bushing assembly relative to a housing opening in a structural member, the bushing assembly comprising a bushing rod and a bushing sleeve, comprising the following steps. A drive system comprising an actuator, a threaded rod, and a brace nut is provided. A pullbar socket is operatively connected to the threaded rod and the bushing rod. A receiver assembly is arranged to engage the structural member and the actuator. The actuator is operated to displace the brace nut, the threaded rod, and the pullbar socket to remove the bushing rod from the bushing assembly.

BRIEF DESCRIPTION OF THE DRAWINGS

FIG. 15 is an exploded side elevation view illustrating the components of a fourth example bushing assembly insertion system of the present invention that is adapted to insert a bushing assembly into bushing opening in a structural member;

FIG. 22 is side elevation view of the set of components depicted in FIG. 21;

FIG. 23 is side elevation section view of the set of components depicted in FIG. 21;

DETAILED DESCRIPTION

Figure 1:
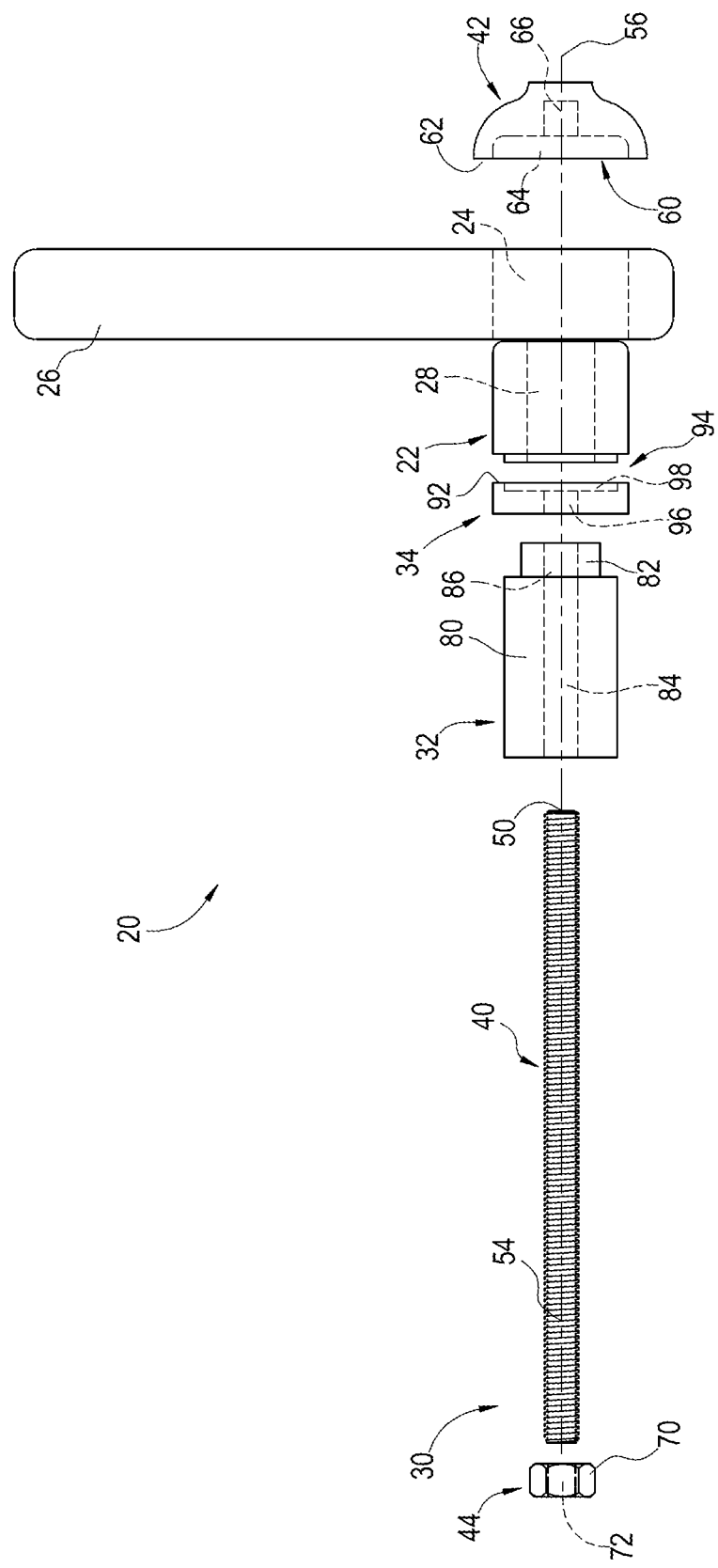
FIG. 1 is an exploded side elevation view illustrating the components of a first example bushing assembly insertion system of the present invention that is adapted to insert a bushing assembly into bushing opening in a structural member.

Referring initially to FIG. 1 of the drawing, depicted therein is a first example bushing assembly insertion system 20 constructed in accordance with, and embodying, the principles of the present invention. FIG. 1 further illustrates that the first example bushing assembly insertion system 20 may be used to insert an example bushing assembly 22 into an example housing opening 24 defined by an example structural member 26. FIG. 1 further illustrates that the example bushing assembly 22 defines a bushing assembly opening 28 sized and dimensioned to receive a shaft (not shown). The example bushing assembly 22 and structural member 26, including the housing opening 24, are or may be conventional and will not be described herein beyond that extent helpful for a complete understanding of the construction and operation of the first example bushing assembly insertion system 20.

Figure 2:
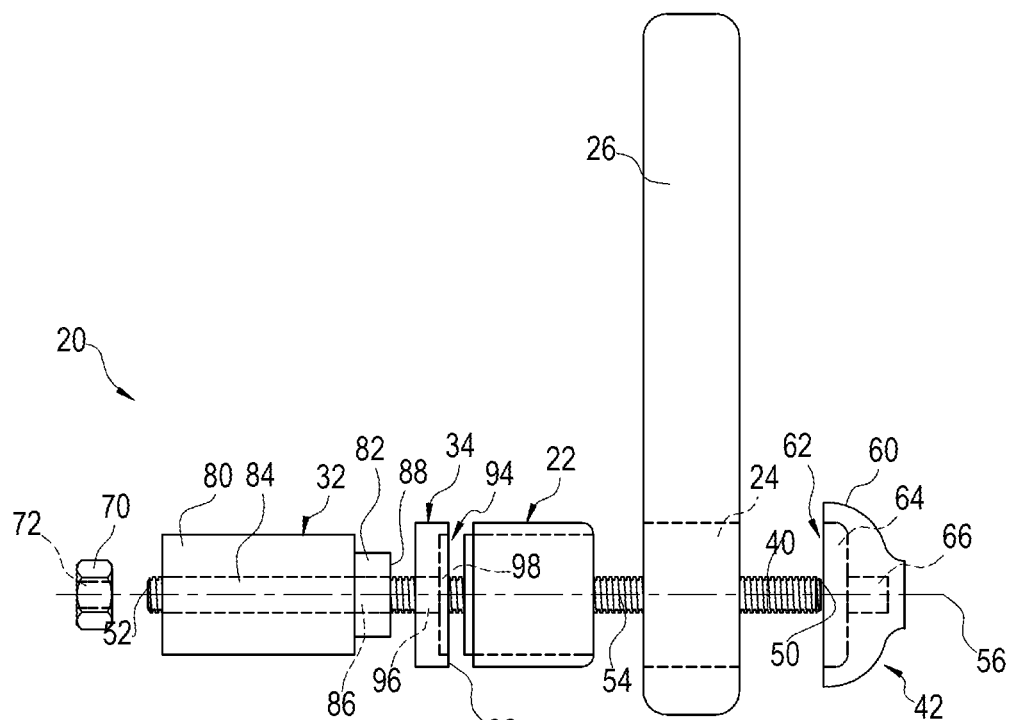
FIG. 2 is partial exploded side elevation view of the first example bushing assembly insertion system, the bushing assembly, and the structural member.

As shown in FIGS. 1 and 2, the first example bushing assembly insertion system 20 comprises a brace assembly 30, an actuator assembly 32, and a drive plate 34. The example brace assembly 30 comprises a brace rod 40, an anchor member 42, and a brace nut 44. At least a portion of the example brace rod 40 is arranged to extend through bushing assembly opening 28 in the bushing assembly 22 and the housing opening 24 in the structural member 26 to support the brace nut 44, the actuator assembly 32, the drive plate 34 on a first side of the housing opening 24 and the anchor member 42 on a second side of the housing opening 24. So arranged, operation of the actuator assembly 32 acts on the bushing assembly 22 through the drive plate 34 to force the bushing assembly 22 into the bushing assembly opening 24. The example brace assembly 30 engages the structural member 26 to prevent the actuator assembly 32 from displacing itself away from the structural member 26 during operation of the actuator assembly 32.

Given the foregoing general understanding of the construction and operation of the first example bushing assembly insertion system 20, the details of construction and operation of the first example bushing assembly insertion system 20 of the present invention will now be described.

The example brace rod 40 defines a first rod end 50 and a second rod end 52, and an outer surface 54 of the example brace rod 40 is threaded at least adjacent to the first rod end 52 and to the second rod end 54. The example brace rod 40 as depicted is threaded along its entire length, but only a portion of the brace rod 40 need be threaded as will become apparent from the following discussion. The example brace rod 40 defines a brace rod axis 56.

The example anchor member 42 defines an anchor cavity 60 and an anchor edge surface 62. The anchor cavity 60 defines an anchor cavity spacing portion 64 and an anchor cavity threaded portion 66. The anchor cavity threaded portion 66 is sized and dimensioned to receive the threaded outer surface 54 of the brace rod 40 adjacent to the first rod end 50. Accordingly, axial rotation of the brace rod 40 and anchor member 42 relative to each other about the brace rod axis 56 with the threaded outer surface 54 within the anchor cavity threaded portion 66 prevents displacement of the anchor member 42 relative to the brace rod 40 along the brace rod axis 56 under predetermined tension loads exerted by the actuator assembly 32.

The example brace nut 44 is or may be conventional and defines an external nut surface 70 and an internal threaded nut opening 72. The internal threaded nut opening 72 is sized and dimensioned to receive the threaded outer surface 54 of the brace rod 40 adjacent to the second rod end 52. Accordingly, axial rotation of the brace rod 40 and brace nut 44 relative to each other about the brace rod axis 56 with the threaded outer surface 54 within the internal threaded nut opening 72 prevents displacement of the brace nut 44 relative to the brace rod 40 along the brace rod axis 56 under predetermined tension loads exerted by the actuator assembly 32. The example external nut surface 50 is a hex surface but other surface configurations may be used.

The example actuator assembly 32 comprises an actuator housing 80 and an actuator drive member 82. The example actuator assembly 32 is or may be conventional and will be described herein only to that extent helpful for a complete understanding of the construction and operation of the first example bushing assembly insertion system 20. The example actuator housing 80 defines an actuator housing opening 84, and the example actuator drive member 82 defines an actuator drive member opening 86. The example drive member 82 defines a drive surface 88. Operation of the example actuator assembly 32 causes displacement of the example actuator drive member 82 relative to the actuator housing 80. The example actuator assembly 32 may be operated using an electrical drive system, pneumatic drive system, hydraulic drive system, or any other appropriate drive system. The drive system used to supply power to the example actuator system 32 is or may be conventional and is not depicted in the drawing for simplicity and clarity.

The example drive plate 34 defines a first drive plate surface 90, a second drive plate surface 92, and a drive plate opening 94. The example drive plate opening 94 defines a drive plate opening first portion 96 and a drive plate opening second portion 98. The drive plate opening 94 extends between the first drive plate first surface 90 and the second drive plate second surface 92.

As perhaps best shown in FIG. 2, the example brace rod 40 is sized and dimensioned such that the example brace rod 40 may be arranged to extend through the actuator housing opening 84, the actuator drive member opening 86, the adapter late opening 94, and the bushing opening 28. FIG. 2 further illustrates that the example brace rod 40 is sized and dimensioned to extend through the anchor cavity spacing portion 64 of the anchor cavity 60. And as described above, the anchor rod 40 is further sized and dimensioned such that to be threaded into the anchor cavity threaded portion 66 and at least partly into the internal nut threaded opening 72. As arranged in FIG. 2, the rod axis 56 of the brace rod 40 defines a longitudinal axis of the first example bushing assembly insertion system 20.

Figure 3:
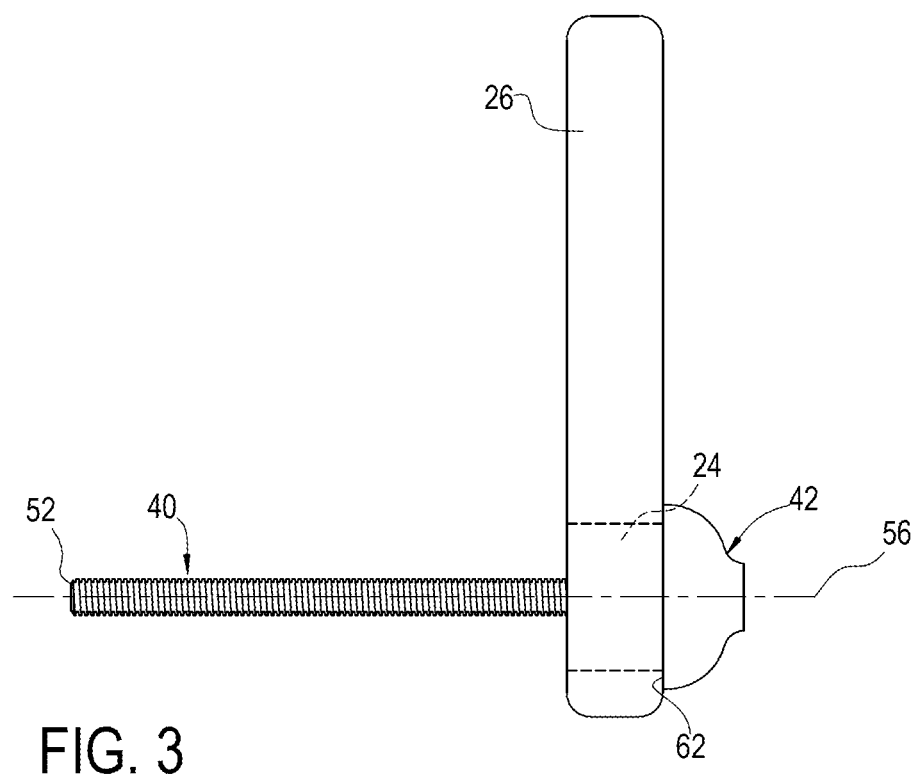
FIGS. 3-11 are side elevation views depicting steps of an example process of using the first example bushing assembly insertion system to insert the bushing assembly into the bushing opening in the structural member.

FIGS. 3-11 illustrate an example method of using the first example bushing assembly insertion system 20. Initially, as shown in FIG. 3, the anchor cavity threaded portion 66 is engaged with the external surface 54 of the brace rod 40 to fix a position of the anchor member 42 relative to the brace rod 40. The brace rod 40 is then arranged such that the brace rod 40 extends through the housing opening 24 with the axis 56 of the brace rod 40 substantially aligned with a longitudinal axis of the housing opening 24. At this point, the anchor edge 62 defined by the anchor member 42 is in contact with the structural member 26 around the housing opening 24.

Figure 4:
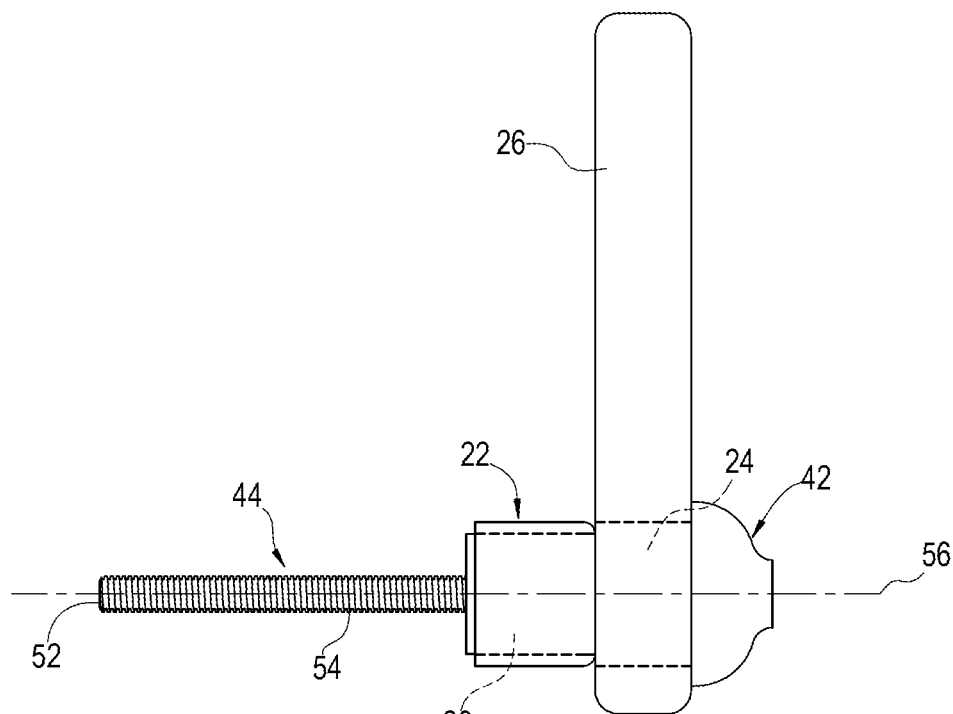

Next, as shown in FIG. 4 the bushing assembly 22 is arranged such that the brace rod 40 extends through the bushing opening 28 defined by the bushing assembly 22 with the axis 56 of the brace rod 40 substantially aligned with a longitudinal axis of the bushing assembly 22.

Figure 5:
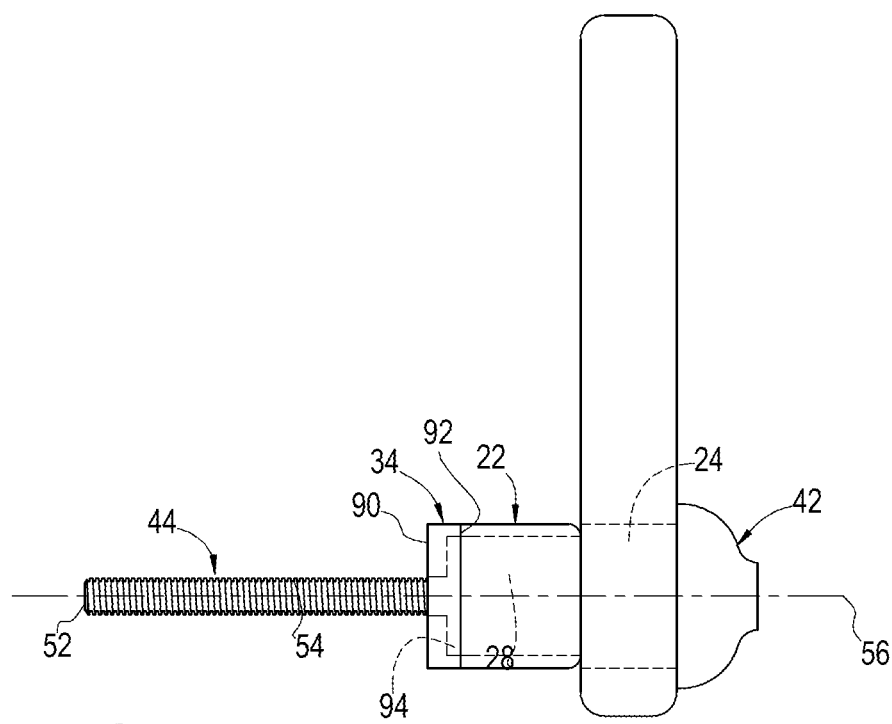

As shown in FIG. 5, the drive plate 34 is next arranged such that the brace rod 40 extends through the drive plate opening 94 and the drive plate second surface 92 is in contact with the bushing assembly 22. In this position, a longitudinal axis of the drive plate 34 is substantially aligned with the brace rod axis 56.

Figure 6:
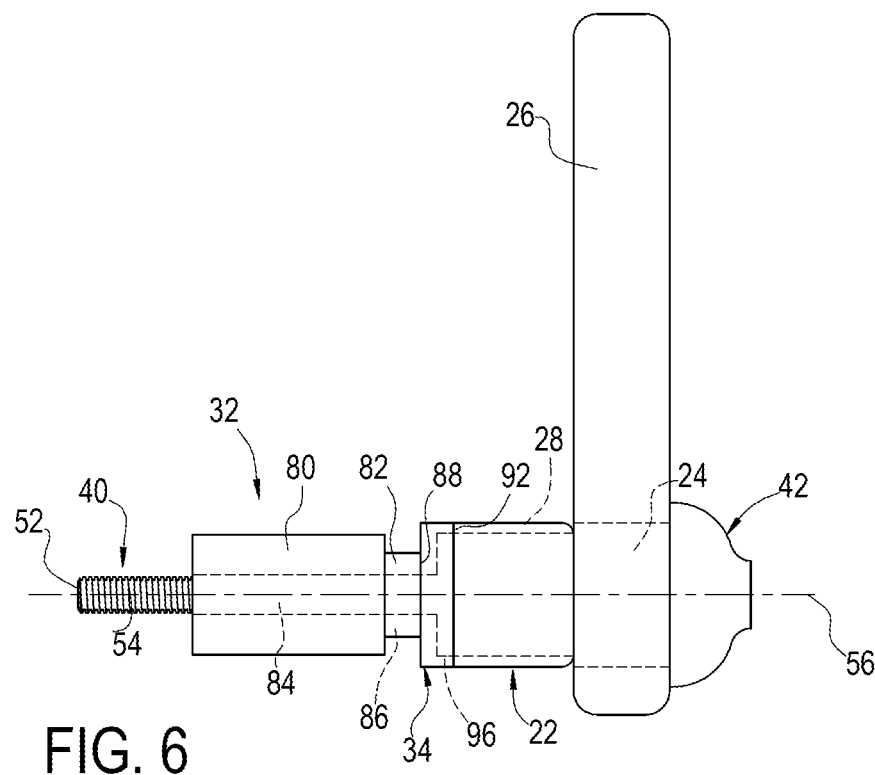

As shown in FIG. 6, the actuator assembly 32 is next arranged such that the brace rod 40 extends through the actuator housing opening 84 and the actuator drive member opening 86. At this point, the drive surface 88 of the actuator drive member 82 is in contact with the drive plate first surface 92. With the actuator assembly 32 so arranged, a longitudinal axis of the actuator assembly 32 is substantially aligned with the brace rod axis 56.

Figure 7:
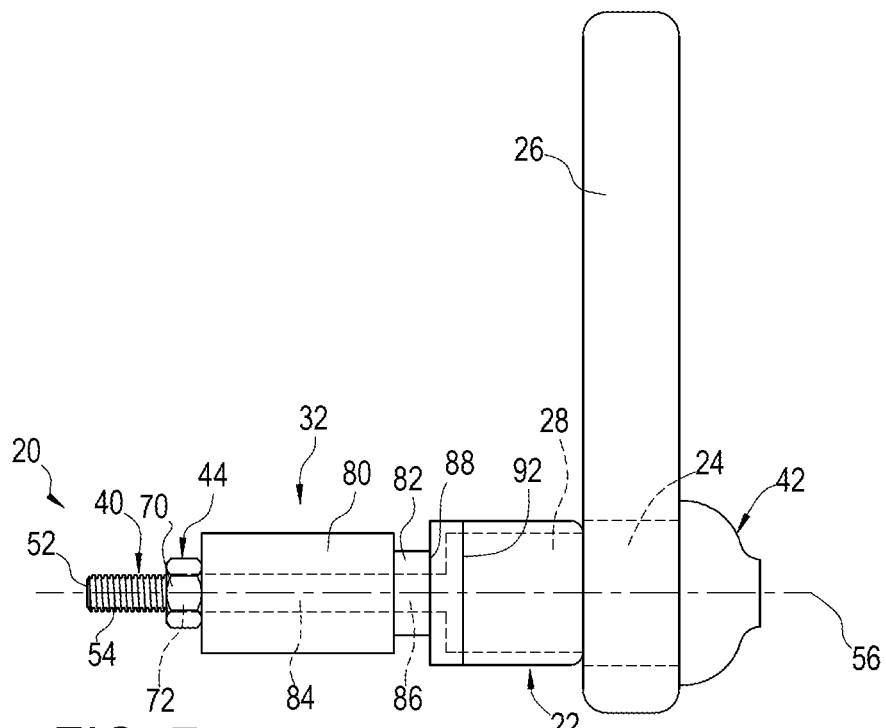
Figure 8:
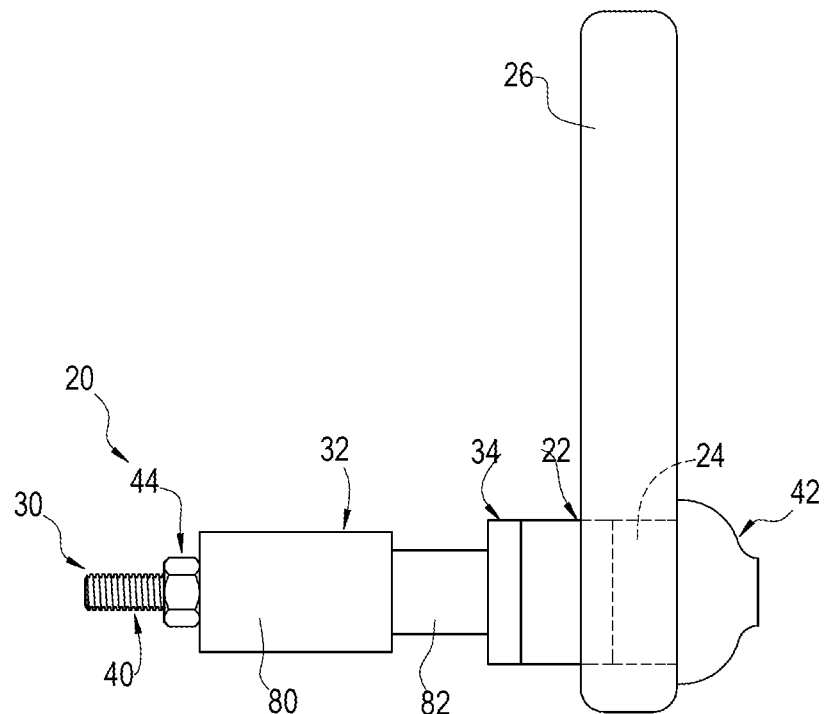

FIG. 7 illustrates that the brace nut 44 is next arranged such that the brace rod 40 engages the internal threaded opening 72 of the brace nut 44. Axial rotation of the brace nut 44 relative to the brace rod 40 displaces the brace nut 44 along the axis 56 of the brace rod 40 until the brace nut engages the actuator housing 80. At this point, the brace assembly 30 is formed, and a distance between the brace nut 44 and the anchor member 42 is substantially fixed. When the brace assembly 30 is formed, the first example bushing assembly insertion system 20 is formed.

With the brace assembly 30 formed as described above, operation of the actuator assembly 32 causes the actuator member 82 to be displaced away from the actuator housing 80 along the rod axis 56. The actuator member 82 acts on and displaces the drive plate 34 which in turn acts on and displaces the bushing assembly 22. The brace assembly 30 prevents movement of the anchor member 42 relative to the structural member 26, so operation of the actuator assembly 32 forces the bushing assembly 22 into the housing opening 24 defined by the structural member 26 as shown by a comparison of FIGS. 7 and 8.

Figure 9:
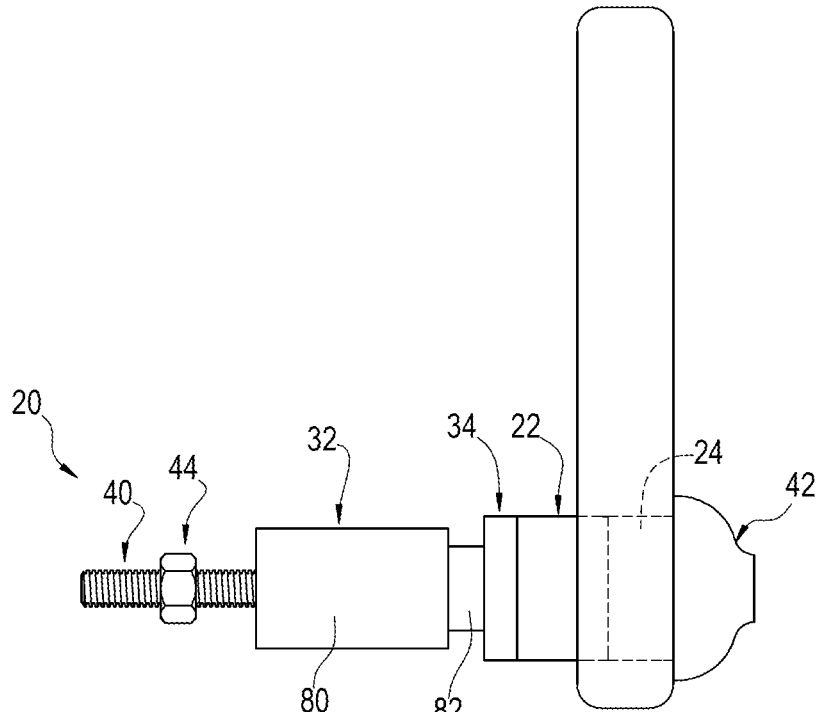
Figure 10:
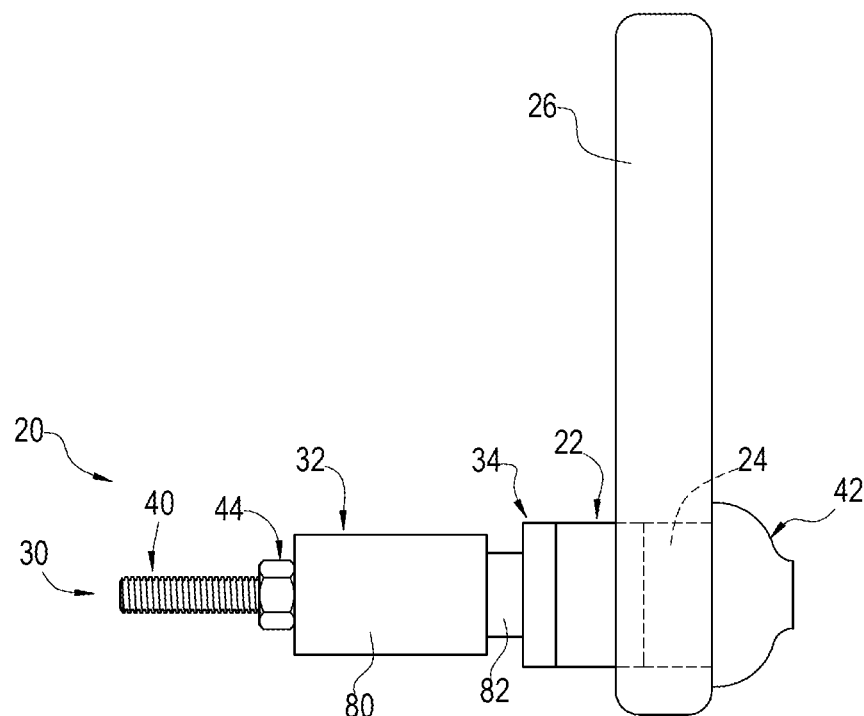

The actuator assembly 32 defines a maximum "throw" distance that the drive member 82 may be forced out of the actuator housing 80. If the throw distance is insufficient to fully drive the bushing assembly 22 into the housing opening, the actuator assembly 32 may be turned off and the actuator housing 80 may be displaced towards the bushing assembly 22 as shown in FIG. 9. The brace nut 44 may be then rotated such that brace nut 44 is displaced along the brace rod 40 until the brace nut 44 contacts the housing as shown in FIG. 10.

Figure 11:
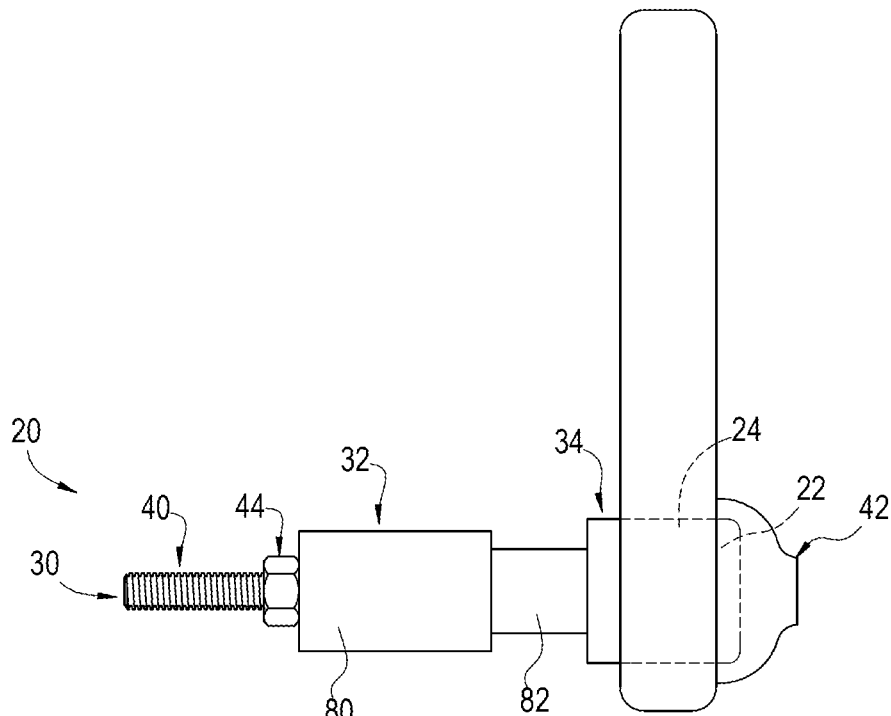
Figure 12:
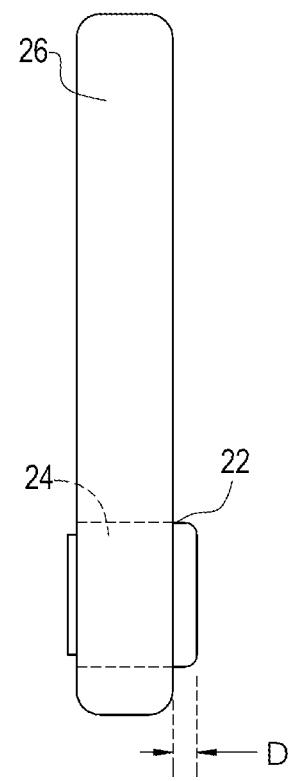
FIG. 12 depicts the bushing assembly supported by the structural member in a desired position relative to the structural member.

The actuator assembly 32 may then be operated to drive the bushing assembly 22 into the bushing assembly opening 24 until the bushing assembly comes into contact with the anchor plate 42 as shown in FIG. 11. At this point, the anchor cavity spacing portion 64 defined by the anchor plate 42 is sized and dimensioned such that the bushing assembly 22 extends out of the housing opening 24 by a desired predetermined distance D as shown in FIG. 12. Accordingly, the anchor plate 42 is configured to stop further movement as soon as the bushing assembly 22 is a desired position relative to the bushing assembly opening 24.

Figure 13:
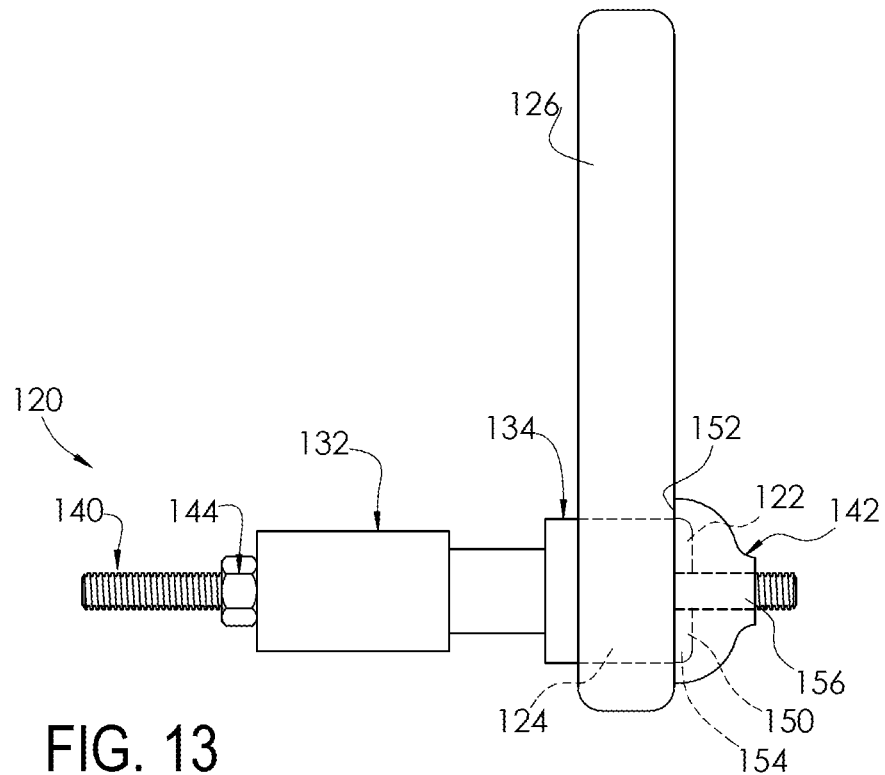
FIG. 13 is a side elevation view illustrating the components of a second example bushing assembly insertion system of the present invention that is adapted to insert a bushing assembly into a bushing opening defined by a structural member.

Referring now to FIG. 13 of the drawing, depicted therein is a second example bushing assembly insertion system 120 constructed in accordance with, and embodying, the principles of the present invention. FIG. 13 illustrates that the first example bushing assembly insertion system 120 may be used to insert an example bushing assembly 122 into an example housing opening 124 defined by an example structural member 126. The example bushing assembly 122 and structural member 126, including the housing opening 124, are or may be conventional and will not be described herein beyond that extent helpful for a complete understanding of the construction and operation of the second example bushing assembly insertion system 120.

The second example bushing assembly insertion system 120 comprises a brace assembly 130, an actuator assembly 132, and a drive plate 134. The example brace assembly 130 comprises a brace rod 140, an anchor member 142, and a brace nut 144. During use of the second example bushing assembly insertion system 120, at least a portion of the example brace rod 140 is arranged to extend through a bushing assembly opening (not shown) in the bushing assembly 122 and the housing opening 124 in the structural member 126 to support the brace nut 144, the actuator assembly 132, the drive plate 134 on a first side of the housing opening 124 and the anchor member 142 on a second side of the housing opening 124. So arranged, operation of the actuator assembly 132 acts on the bushing assembly 122 through the drive plate 134 to force the bushing assembly 122 into the bushing assembly opening 124. The example brace assembly 130 engages the structural member 126 to prevent the actuator assembly 132 from displacing itself away from the structural member 126 during operation of the actuator assembly 132.

The example brace rod 140 and brace nut 144 are or may be the same as the example brace rod 40 and brace nut 44 described above and will not be described herein again in detail.

The example anchor member 142 defines an anchor cavity 160 and an anchor edge 162. The anchor cavity 160 defines an anchor cavity spacing portion 164 and an anchor cavity threaded portion 166. The anchor cavity threaded portion 66 is sized and dimensioned to receive the threaded outer surface of the brace rod 140 adjacent to the first rod end. The example anchor cavity threaded portion 166 further allows the brace rod 140 to extend out of the anchor cavity 160 as shown in FIG. 13. Axial rotation of the brace rod 140 and anchor member 142 relative to each other about a brace rod axis prevents displacement of the anchor member 142 relative to the brace rod 140 along the brace rod axis under predetermined tension loads exerted by the actuator assembly 132.

The second example bushing assembly insertion system 120 is otherwise used in a manner similar to that of the first example bushing assembly insertion system 20 described above.

Figure 14:
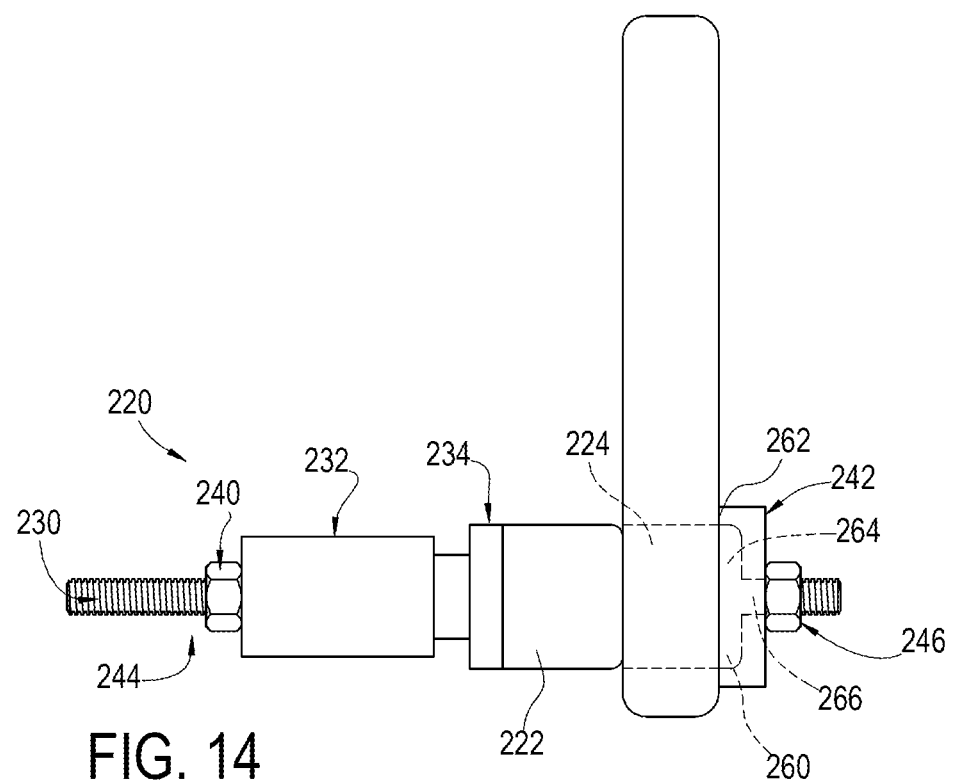
FIG. 14 is a side elevation view illustrating the components of a third example bushing assembly insertion system of the present invention that is adapted to insert a bushing assembly into a bushing opening defined by a structural member.

Referring now to FIG. 14 of the drawing, depicted therein is a third example bushing assembly insertion system 220 constructed in accordance with, and embodying, the principles of the present invention. FIG. 14 illustrates that the first example bushing assembly insertion system 220 may be used to insert an example bushing assembly 222 into an example housing opening 224 defined by an example structural member 226. The example bushing assembly 222 and structural member 226, including the housing opening 224, are or may be conventional and will not be described herein beyond that extent helpful for a complete understanding of the construction and operation of the third example bushing assembly insertion system 220.

The third example bushing assembly insertion system 220 comprises a brace assembly 230, an actuator assembly 232, and a drive plate 234. The example brace assembly 230 comprises a brace rod 240, an anchor member 242, a first brace nut 244, and a second brace nut 246.

During use of the third example bushing assembly insertion system 220, at least a portion of the example brace rod 240 is arranged to extend through a bushing assembly opening (not shown) in the bushing assembly 222 and the housing opening 224 in the structural member 226 to support the brace nut 244, the actuator assembly 232, the drive plate 234 on a first side of the housing opening 224 and the anchor member 242 on a second side of the housing opening 224. So arranged, operation of the actuator assembly 232 acts on the bushing assembly 222 through the drive plate 234 to force the bushing assembly 222 into the bushing assembly opening 224. The example brace assembly 230 engages the structural member 226 to prevent the actuator assembly 232 from displacing itself away from the structural member 226 during operation of the actuator assembly 232.

The example brace rod 240 and brace nut 244 are or may be the same as the example brace rod 40 and brace nut 44 described above and will not be described herein again in detail.

The example anchor member 242 defines an anchor cavity 260 and an anchor edge 262. The anchor cavity 260 defines an anchor cavity spacing portion 264 and an anchor cavity through portion 266. The anchor cavity through portion 266 is sized and dimensioned to allow the threaded outer surface of the brace rod 240 adjacent to the first rod end to extend out of the anchor cavity 260 as shown in FIG. 14. Axial rotation of the brace rod 240 relative to the first brace nut 244 and the second brace nut 246 about a brace rod axis prevents displacement of the anchor member 242 relative to the brace rod 240 along the brace rod axis under predetermined tension loads exerted by the actuator assembly 232.

The third example bushing assembly insertion system 220 is otherwise used in a manner similar to that of the first example bushing assembly insertion system 20 described above.

Referring now to FIG. 15 of the drawing, depicted therein is a fourth example bushing assembly insertion system 320 constructed in accordance with, and embodying, the principles of the present invention. FIG. 15 further illustrates that the fourth example bushing assembly insertion system 320 may be used to insert an example bushing assembly 322 into an example housing opening 324 defined by an example structural member 326. FIG. 15 further illustrates that the example bushing assembly 322 defines a bushing assembly opening 328 sized and dimensioned to receive a shaft (not shown). The example bushing assembly 322 and structural member 326, including the housing opening 324, are or may be conventional and will not be described herein beyond that extent helpful for a complete understanding of the construction and operation of the fourth example bushing assembly insertion system 320.

Bushing assemblies such as the example bushing assembly 322 are sold in numerous shapes and sizes. The example bushing assembly 322 defines a first end configuration 322*a* and a second end configuration 322*b*. The end configurations 322*a* and 322*b* differ for differing bushing assemblies.

As shown in FIG. 1, the fourth example bushing assembly insertion system 320 comprises a brace assembly 330, an actuator assembly 32, and a drive plate 334. The example brace assembly 330 comprises a brace rod 340, an anchor member 342, and a brace nut 344. At least a portion of the example brace rod 340 is arranged to extend through bushing assembly opening 328 in the bushing assembly 322 and the housing opening 324 in the structural member 326 to support the brace nut 344, the actuator assembly 32, the drive plate 334 on a first side of the housing opening 324 and the anchor member 342 on a second side of the housing opening 324. So arranged, operation of the actuator assembly 32 acts on the bushing assembly 322 through the drive plate 334 to force the bushing assembly 322 into the bushing assembly opening 324. The example brace assembly 330 engages the structural member 326 to prevent the actuator assembly 32 from displacing itself away from the structural member 326 during operation of the actuator assembly 32.

Given the foregoing general understanding of the construction and operation of the fourth example bushing assembly insertion system 320, the details of construction and operation of the fourth example bushing assembly insertion system 320 of the present invention will now be described.

The example brace rod 340 defines a first rod end 350 and a second rod end 352, and an outer surface 354 of the example brace rod 340 is threaded at least adjacent to the first rod end 352 and to the second rod end 354. The example brace rod 340 as depicted is threaded along its entire length, but only a portion of the brace rod 340 need be threaded as will become apparent from the following discussion. The example brace rod 340 defines a brace rod axis 356.

The example anchor member 342 defines an anchor cavity 360 and an anchor edge surface 362. The anchor cavity 360 defines an anchor cavity recess portion 364 and an anchor cavity threaded portion 366. The anchor cavity threaded portion 366 is sized and dimensioned to receive the threaded outer surface 354 of the brace rod 340 adjacent to the first rod end 350. Accordingly, axial rotation of the brace rod 340 and anchor member 342 relative to each other about the brace rod axis 356 with the threaded outer surface 354 within the anchor cavity threaded portion 366 prevents displacement of the anchor member 342 relative to the brace rod 340 along the brace rod axis 356 under predetermined tension loads exerted by the actuator assembly 32. The anchor cavity recess portion 364 is adapted to receive the second end 322b of the bushing assembly 322.

The example brace nut 344 is or may be conventional and defines an external nut surface 370 and an internal threaded nut opening 372. The internal threaded nut opening 372 is sized and dimensioned to receive the threaded outer surface 354 of the brace rod 340 adjacent to the second rod end 352. Accordingly, axial rotation of the brace rod 340 and brace nut 344 relative to each other about the brace rod axis 356 with the threaded outer surface 354 within the internal threaded nut opening 372 prevents displacement of the brace nut 344 relative to the brace rod 340 along the brace rod axis 356 under predetermined tension loads exerted by the actuator assembly 32. The example external nut surface 350 is a hex surface but other surface configurations may be used.

The example actuator assembly 32 comprises an actuator housing 380 and an actuator drive member 382. The example actuator assembly 32 is or may be conventional and will be described herein only to that extent helpful for a complete understanding of the construction and operation of the fourth example bushing assembly insertion system 320. The example actuator housing 380 defines an actuator housing opening 384, and the example actuator drive member 382 defines an actuator drive member opening 386. The example drive member 382 defines a drive surface 388 and a first connecting surface 388a. Operation of the example actuator assembly 32 causes displacement of the example actuator drive member 382 relative to the actuator housing 380. The example actuator assembly 32 may be operated using an electrical drive system, pneumatic drive system, hydraulic drive system, or any other appropriate drive system. The drive system used to supply power to the example actuator system 32 is or may be conventional and is not depicted in the drawing for simplicity and clarity.

The example drive plate 334 defines a first drive plate surface 390, a second drive plate surface 392, and a drive plate opening 394. The example drive plate 334 further defines a drive recess 398a and a connecting surface 398b. The example drive plate opening 394 defines a drive plate opening first portion 396 and a drive plate opening second portion 398. The drive plate opening 394 extends between the first drive plate first surface 390 and the second drive plate second surface 392. The drive recess 398a on the drive plate 334 is contoured to receive the first end configuration 322a of the bushing assembly 322 as will be described in further detail below.

The second connecting surface 398b is configured to engage the first connecting surface 388a to allow the drive plate 334 to be detachably attached to the actuator housing 380. The example first drive surface 388a is internally threaded, and the example second drive surface 398b is externally threaded, but other connecting systems for detachably attaching the drive plate 334 to the actuator housing 380 may be used.

As perhaps best shown in FIG. 15, the example brace rod 340 is sized and dimensioned such that the example brace rod 340 may be arranged to extend through the actuator housing opening 384, the actuator drive member opening 386, the adapter late opening 394, and the bushing opening 328. FIG. 15 further illustrates that the example brace rod 340 is sized and dimensioned to extend through the anchor cavity recess portion 364 of the anchor cavity 360. And as described above, the anchor rod 340 is further sized and dimensioned such that to be threaded into the anchor cavity threaded portion 366 and at least partly into the internal nut threaded opening 372. As arranged in FIG. 15, the rod axis 356 of the brace rod 340 defines a longitudinal axis of the fourth example bushing assembly insertion system 320.

The fourth example bushing assembly insertion system 320 is used in a manner similar to that of the first example bushing assembly insertion system 20 described above. However, in the fourth example bushing assembly insertion system 320, the actuator assembly 332 is reversed such that the actuator drive member 382 engages the brace nut 344 and the actuator housing 380 supports the drive plate 334 as generally described above.

The example drive plate 334 and the example anchor member 342 are sold in a variety of configurations to accommodate a variety of configurations of bushing assemblies 322. In particular, the anchor cavity recess portion 364 defined by the anchor member 342 and the drive recess 398a defined by the drive plate 334 are configured as necessary to accommodate a particular bushing assembly 322 and further to locate the particular bushing assembly 322 in a desired position relative to the example structural member 326.

Figure 20:
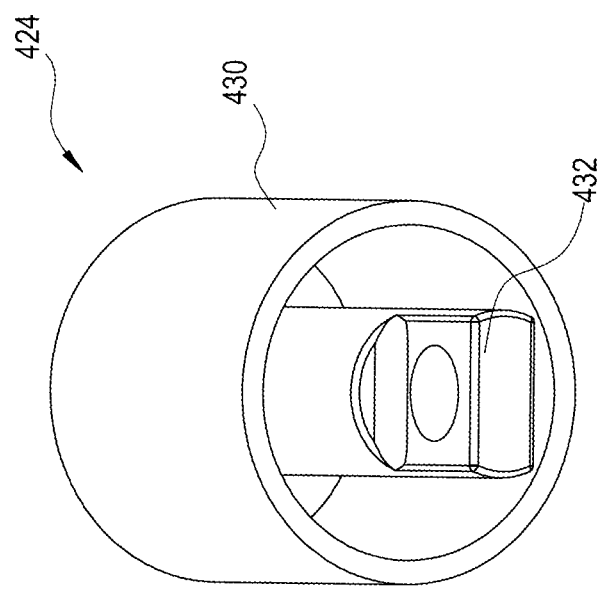
FIG. 20 is a perspective view of a portion of an example bushing assembly to be removed and/or inserted using the methods of FIGS. 16-18.

Referring now to FIGS. 16 and 17 of the drawing, depicted therein is a first example method of removing a bushing assembly 420 from a housing cavity 422 of a housing 424 using an actuator assembly 426. As perhaps best shown in FIG. 20, the example bushing assembly 420 comprises a bushing sleeve 430, bushing pin 432, and elastomeric material (not shown in FIG. 20 for clarity) that supports the bushing pin 432 relative to the bushing sleeve 430. The bushing assembly 420, housing cavity 422, and housing 424 are not per se part of the present invention and are disclosed herein only to that extent helpful to a complete understanding of the present invention.

Figure 16A:
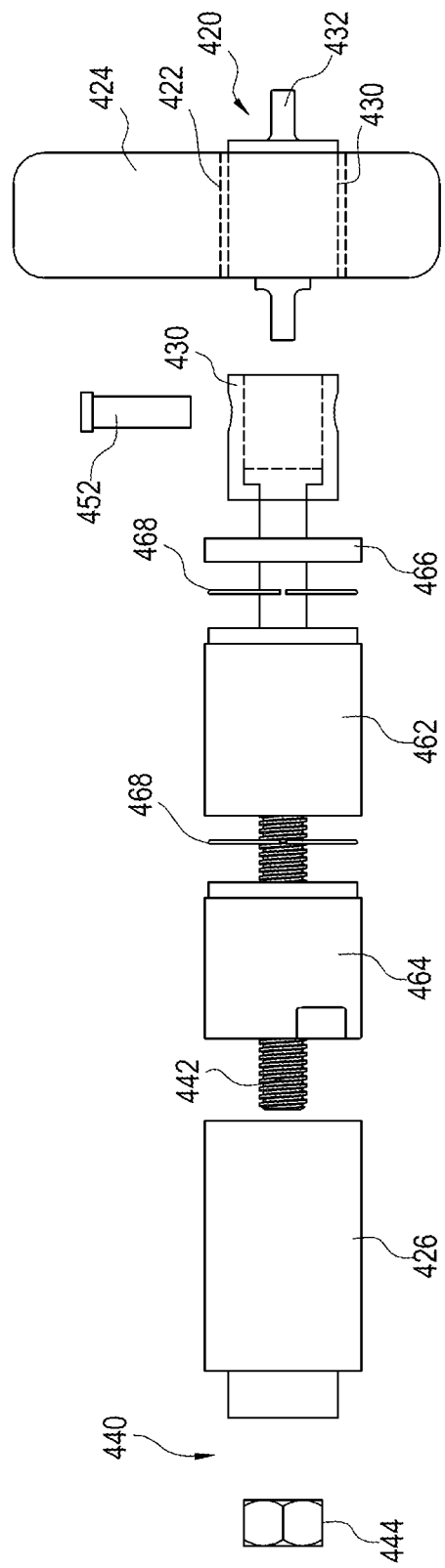
FIG. 16A is an exploded view of a first step of a first example configuration and method of removing a bushing assembly from a housing.
Figure 16B:
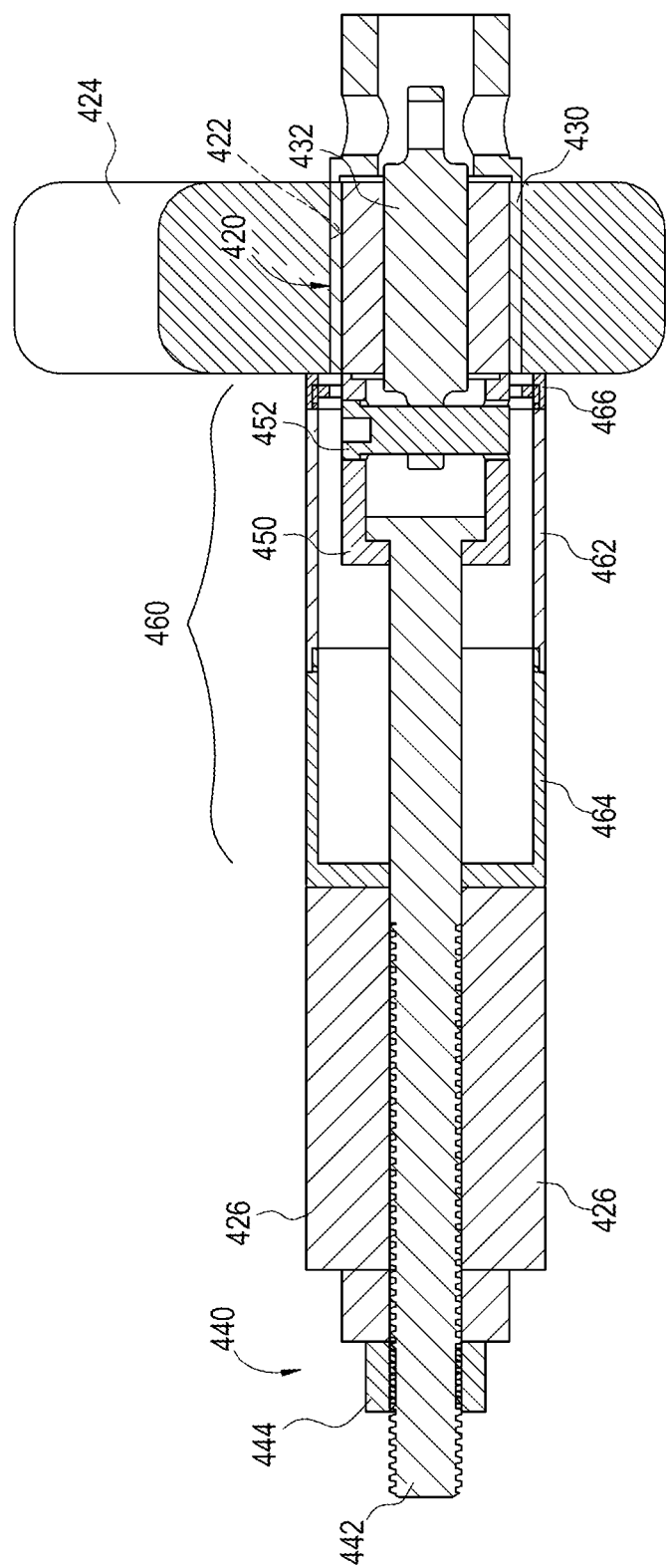
FIG. 16B is section view of the first step of the first example configuration and method of removing a bushing assembly from a housing.

A first step of the first example method of removing the bushing assembly 420 from the housing cavity 422 is shown in FIGS. 16A and 16B. A brace assembly 440 comprising a threaded rod 442 and a nut 444 is provided. The threaded rod 442 is secured to a pullbar socket 450, and the pullbar socket 450 is secured to the bushing pin 432 by a threaded pin 452. A receiver assembly 460 is formed by assembling an extension tube 462, cylinder adapter 464, cylinder tube cap 466, and first and second snap rings 468. The receiver assembly 460 is arranged over the pullbar socket 450 and with the tube cap 466 thereof in contact with (engaging) the housing 424.

An actuator assembly 444 is arranged between the receiver assembly 460 and a nut 446 such that extension of the actuator assembly 444 acts on the nut and the receiver assembly 460 to displace the threaded rod 442 such that the bushing pin 432 is removed from the bushing assembly 420. The bushing sleeve 430 and elastomeric material remains in the housing cavity 422 at this point. When assembled, the actuator assembly 444, nut 446, and threaded rod 442 form a drive assembly in the form of the actuator assembly 426 for displacing the bushing pin 432 relative to the bushing assembly 420.

The user of a receiver assembly 460 comprising a separate cylinder adapter 464 and cylinder tube cap 466 allows the receiver assembly 460 to be arranged in at least two configurations depending upon the specific function be performed. In the example depicted in FIG. 16B, the receiver assembly 460 is in a long configuration. The tube cap 466 is sized and dimensioned relative to the structural housing member 420, the housing cavity 422, and the bushing assembly 420 to allow at least a portion of the bushing assembly 420 to enter the extension tube 462 when removed from the housing cavity 422. In the first step depicted in FIG. 16, the bushing pin 432 and at least a portion of the elastomeric material from the housing 420, leaving the bushing sleeve 430 and perhaps a portion of the elastomeric material within the housing cavity 422.

Figure 17A:
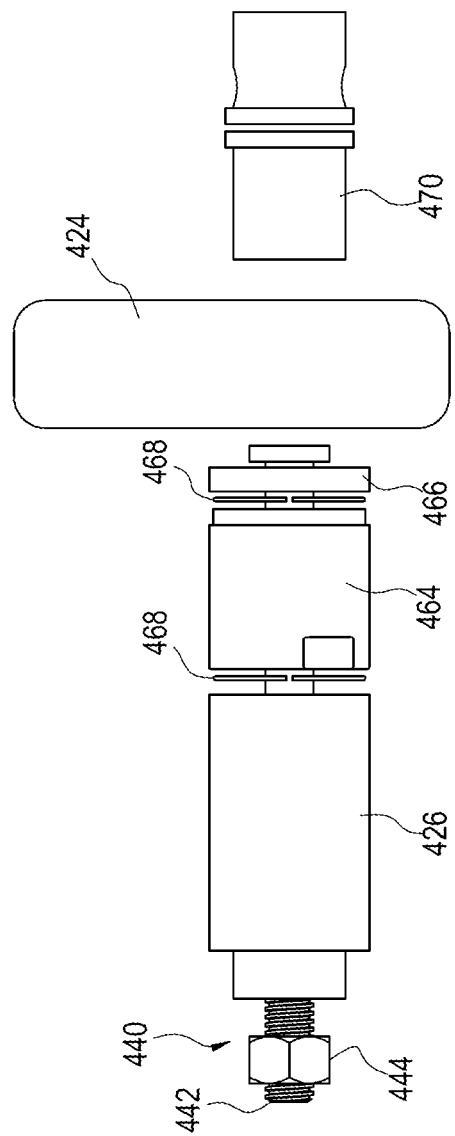
FIG. 17A is an exploded view of a second step of the first example method of removing a bushing assembly from a housing.
Figure 17B:
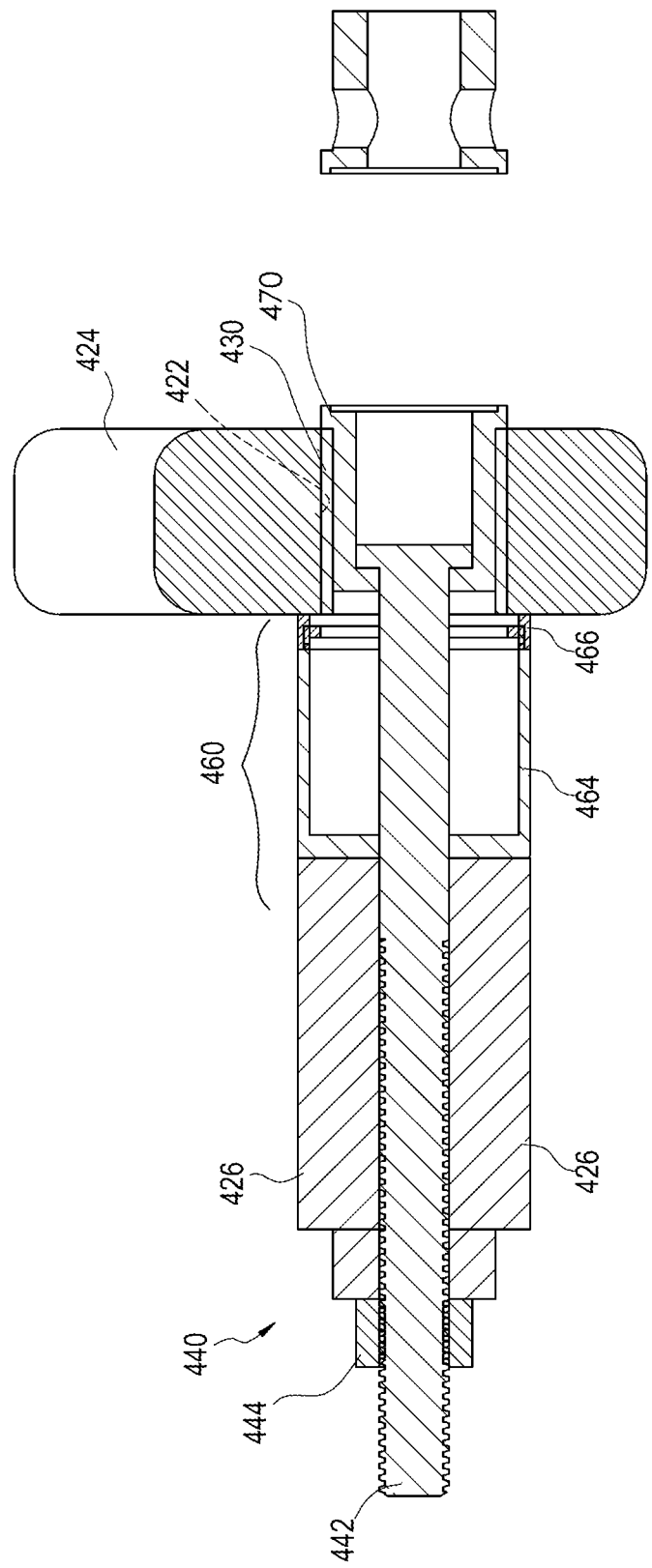
FIG. 17B is section view of the second step of the first example configuration and method of removing a bushing assembly from a housing.

A second step of the first example method of removing the bushing assembly 420 from the housing cavity 422 is shown in FIGS. 17A and 17B. The threaded rod 442 is extended through an opening in the bushing assembly 420 formed by removal of the bushing pin 432 and secured to a sleeve remover 470. The pullbar socket 450 is secured to the bushing pin 432 by a threaded pin 452. The receiver assembly 460 is arranged over the threaded rod 442 in contact with the housing 426. The actuator assembly 444 is arranged between the receiver assembly 460 and a nut 446 such that extension of the actuator assembly 444 acts on the nut and the receiver assembly 460 to displace the threaded rod 442 such that the sleeve remover forces the bushing sleeve 430 (and the elastomeric material within the bushing sleeve 430) from the housing cavity 422.

Again, the user of a receiver assembly 460 comprising a separate cylinder adapter 464 and cylinder tube cap 466 allows the receiver assembly 460 to be arranged in at least two configurations depending upon the specific function be performed. In the example depicted in FIG. 17B, the receiver assembly 460 is in a short configuration. As described above, the tube cap 466 is sized and dimensioned relative to the structural housing member 420, the housing cavity 422, and the bushing assembly 420 to allow at least a portion of the bushing assembly 420 to enter the extension tube 462 when removed from the housing cavity 422. The sleeve remover 470 is sized and dimensioned relative to bushing sleeve 430 and the housing cavity 422 in the structural member 420 to engage the bushing sleeve 430 and enter the cavity 422 when the sleeve 430 is removed. In the second step depicted in FIG. 16, the housing sleeve 430 and any remaining portion of the elastomeric material from is removed from the housing 420. At this point, the entire bushing assembly 420 has been removed.

Figure 18A:
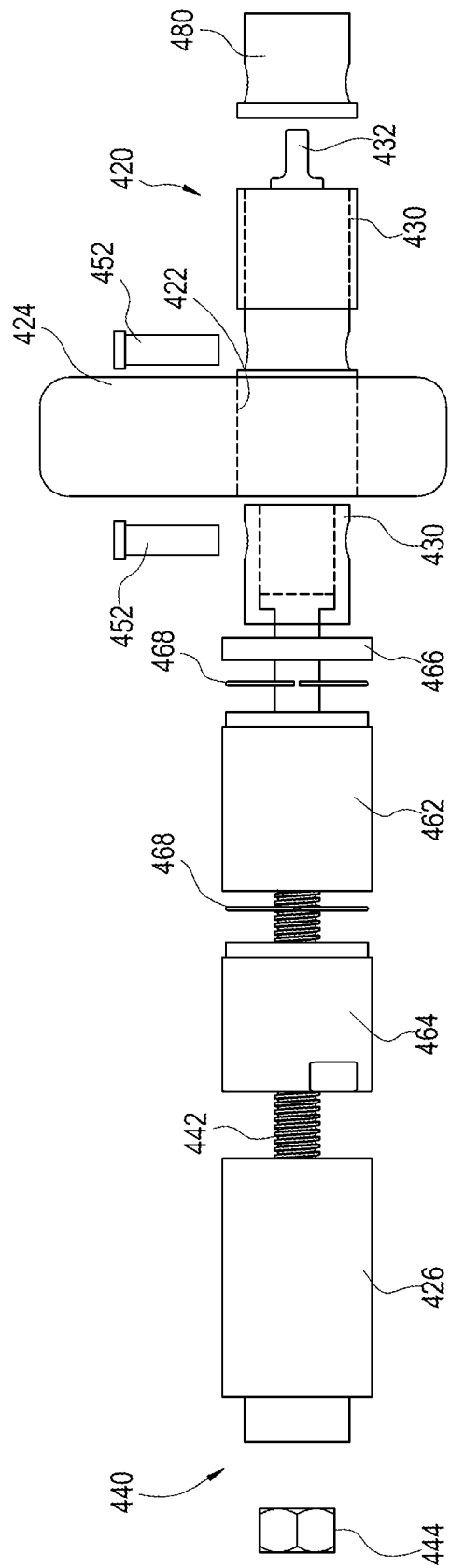
FIG. 18A is an exploded view of an example configuration and method of inserting a bushing assembly into or removing a bushing assembly from a housing.
Figure 18B:
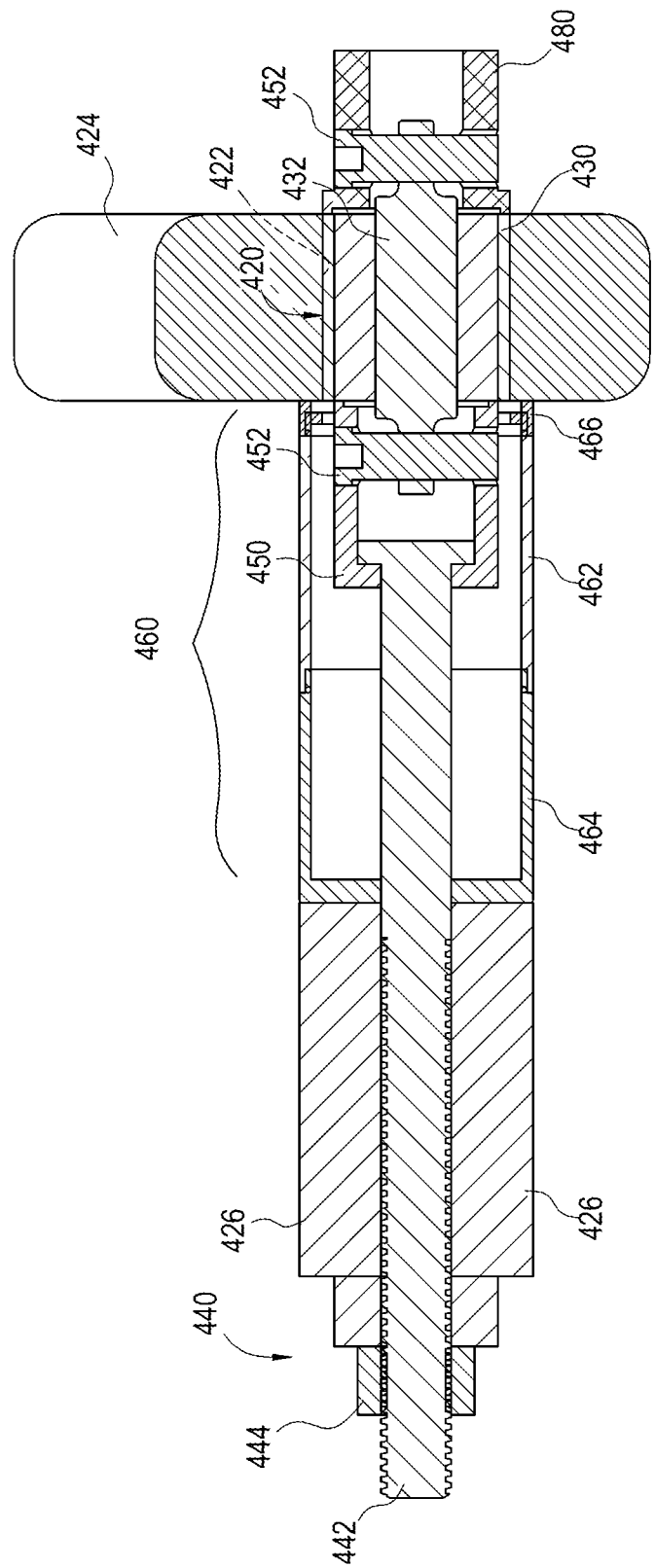
FIG. 18B is section view of the example configuration and method of FIG. 18A depicting the removal of a bushing assembly from a housing.
Figure 18C:
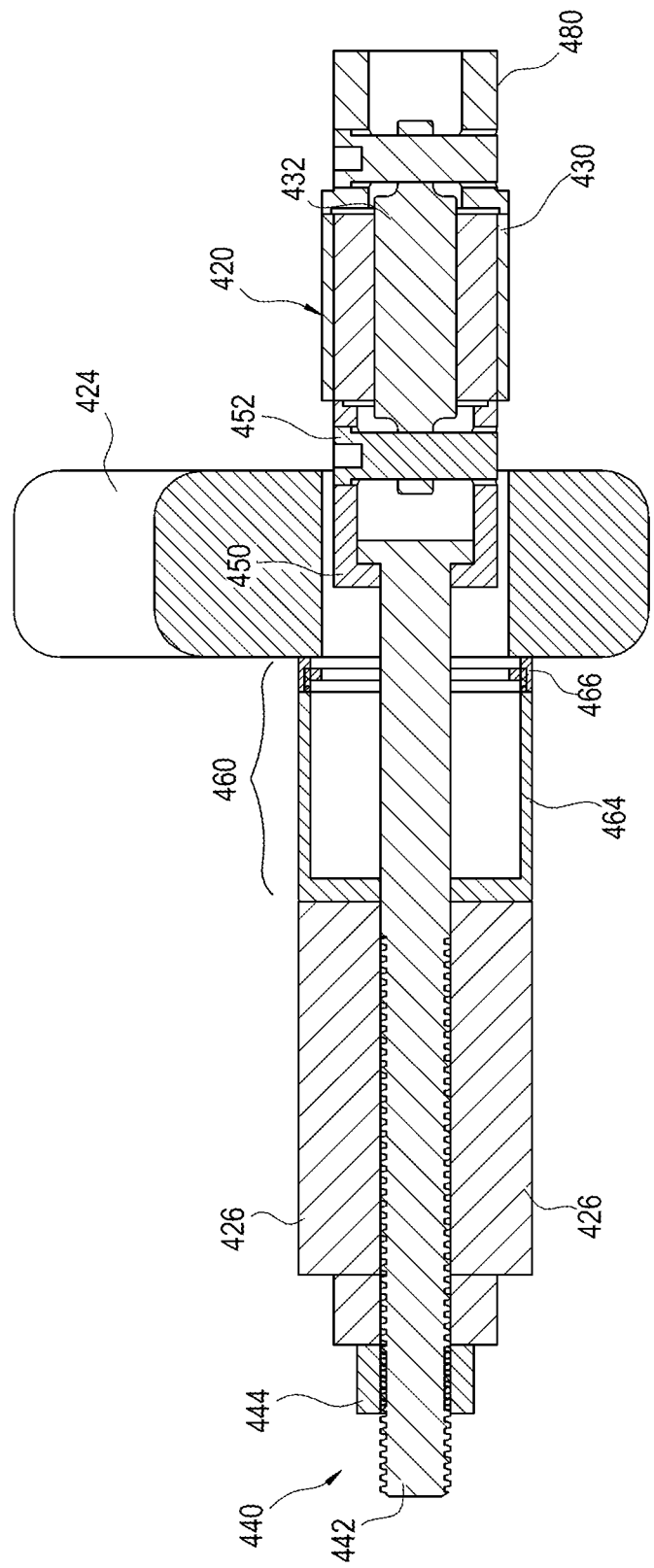
FIG. 18C is section view of the example configuration and method of FIG. 18A depicting the insertion of a bushing assembly into a housing.

FIG. 18A illustrates an example configuration that allows removal of an old bushing assembly 420 or insertion of a new bushing assembly 420 relative to the housing cavity 422. The threaded rod 442 is secured to the pullbar socket 450, and the pullbar socket 450 is secured to the bushing pin 432 by a threaded pin 452. A push adapter 480 is connected to the other end of the bushing pin 432 by a threaded pin 452. The receiver assembly 460 is arranged over the pullbar socket 450 in contact with the housing 424. An actuator assembly 444 is arranged between the receiver assembly 460 and the nut 446 such that extension of the actuator assembly 444 acts on the nut and the receiver assembly 460 to displace the threaded rod 442 such that the bushing assembly 420 is pulled into the housing cavity 422. FIG. 18B illustrates removal of the entire spent bushing assembly 420 in one step, while FIG. 18C illustrates insertion of a new bushing assembly 420.

Figure 19:
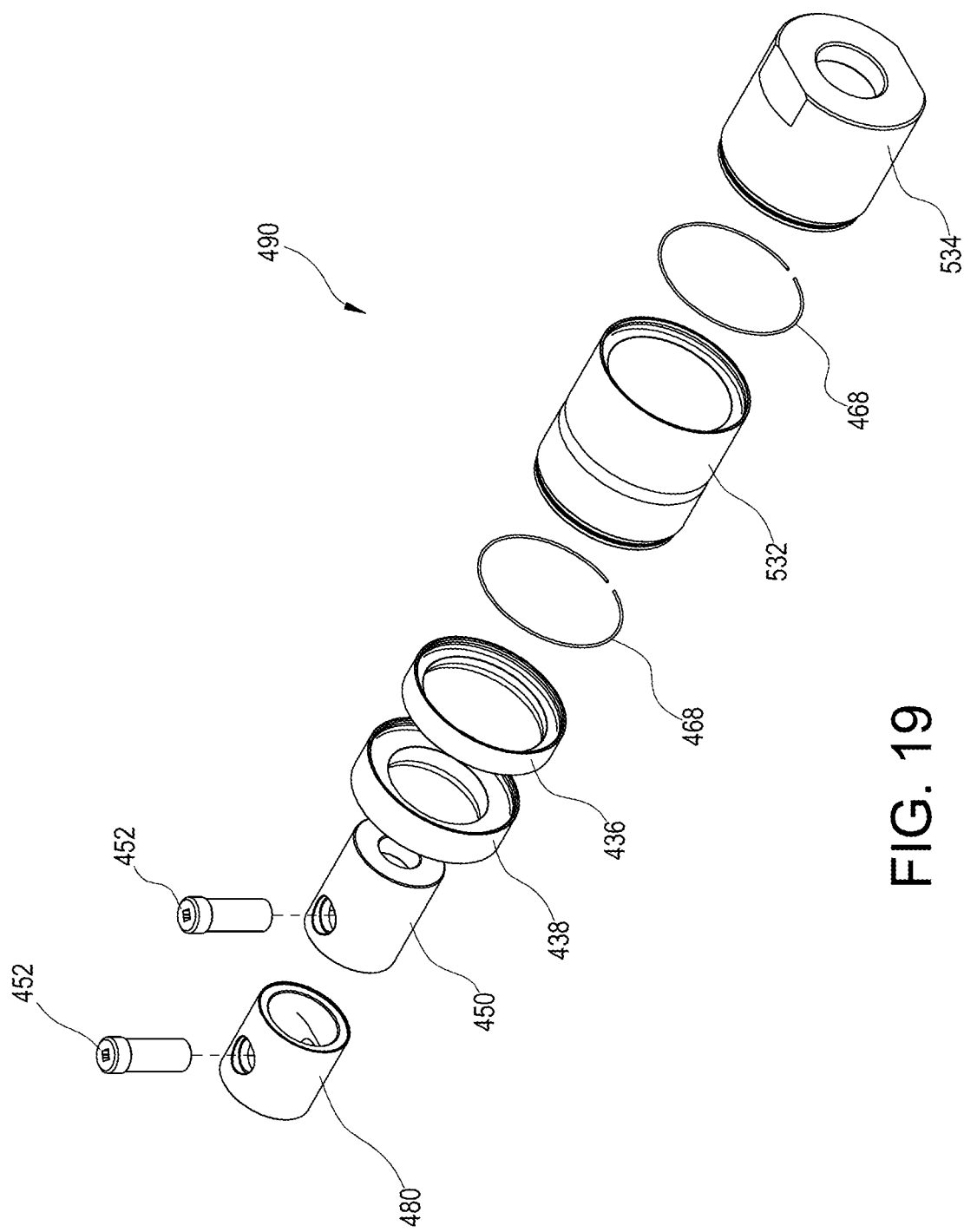
FIG. 19 is an exploded, perspective view of components used in the first example removal method of FIGS. 16 and 17 and the example inserting method of FIG. 18.

FIG. 19 illustrates a first example adapter kit 490 comprising the cylinder adapter 464, the cylinder tube cap 466, the extension tube 462, the pullbar socket 450, the push adapter 480, and the sleeve remover 470 discussed above. The threaded pins 452 and snap rings 468 are or may be conventional and are also depicted in FIG. 19. FIG. 19 also illustrates a conventional socket driver 492 that may be included in the example kit 490 and used to drive the threaded pins 452 as implicit in the discussion above. As generally discussed above, FIG. 20 illustrates an example bushing assembly 430 that may be displaced using the adapter components of FIG. 19. The example kit 490 may include two or more of the tube caps 466, sleeve removers 470, and push adapters 480, where each of these components 466, 470, and/or 480 is configured for a particular configuration of bushing assembly 420 and housing cavity 422 adapted to accommodate that particular bushing assembly 420.

Figure 21:
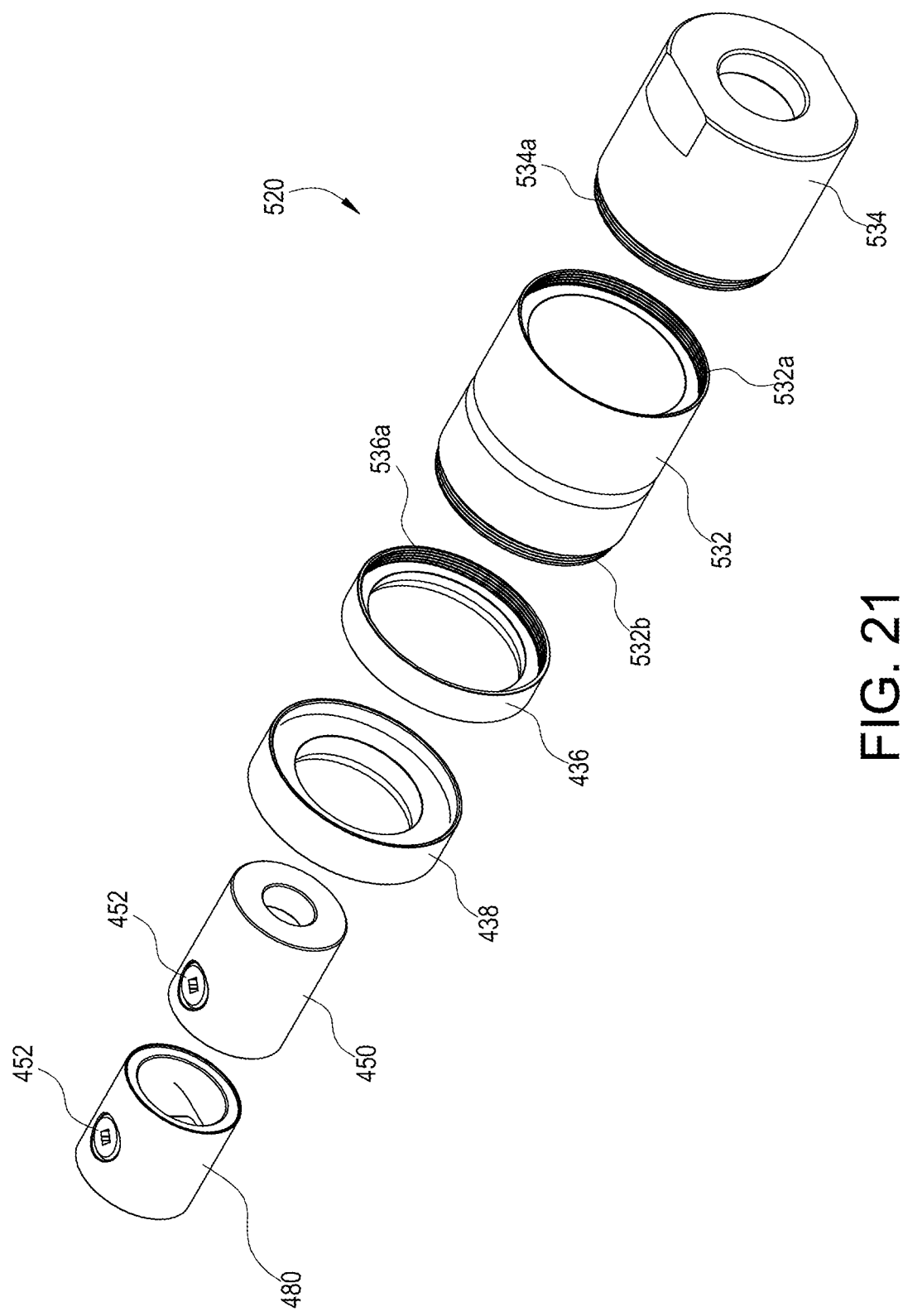
FIG. 21 is an exploded, perspective view of another set of components that may be used in the first example removal method of FIGS. 16 and 17 and the example inserting method of FIG. 18.

FIG. 21 illustrates details of a second example adapter kit 520 comprising an extension tube 532, a cylinder adapter 534, a cylinder tube cap 536, a cylinder tube cap adapter 538, a pullbar socket 450, and a push adapter 480. As with the first example kit 490, threaded pins 452 depicted in FIG. 21 are sized and dimensioned to threadingly engage the pullbar socket 450 and the push adapter 480 and are or may be conventional. As with the first example kit 490, the second example kit 520 may include two or more of the tube caps, sleeve removers, and/or push adapters configured for a particular configuration of bushing assembly and housing cavity adapted to accommodate that particular bushing assembly.

FIGS. 21-23 illustrate that a first threaded surface 534a is formed on the cylinder adapter 534, second and third threaded surfaces 532a and 532b are formed on the extension tube 532, and a fourth threaded surface 536a is formed on the cylinder tube cap 536. The first and second threaded surfaces 534a and 532a are sized and dimensioned to engage each other to allow the cylinder adapter 534 to be detachably attached to the extension tube 532. The third and fourth threaded surfaces 432b and 536a are sized and dimensioned to engage each other to allow cylinder tube cap 536 to be detachably attached to the extension tube 532. The cylinder tube cap 536 defines a first mating surface 536b. The cylinder tube cap adapter 538 defines a second mating surface 538a. The first and second mating surfaces 436b and 538a are sized and dimensioned to engage each other to allow the cylinder tube cap 536 to support the cylinder tube cap adapter 538.

The second example adapter kit 520 may otherwise be used in the same manner as the first example adapter kit 490 described above.

Figure 24:
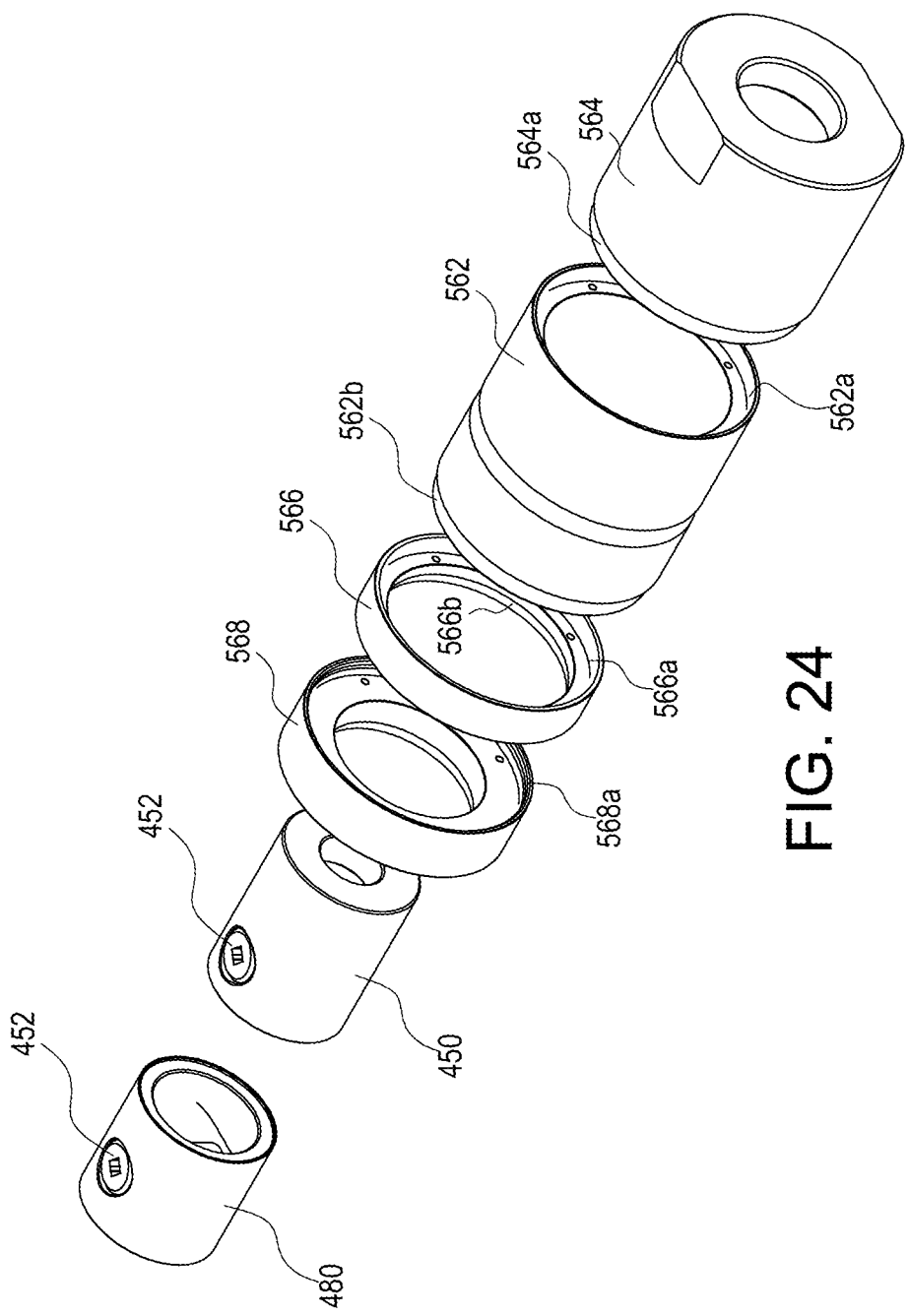
FIG. 24 is an exploded, perspective view of yet another set of components that may be used in the first example removal method of FIGS. 16 and 17 and the example inserting method of FIG. 18.

FIG. 24 illustrates details of a third example adapter kit 550 comprising an extension tube 562, a cylinder adapter 564, a cylinder tube cap 466M, a cylinder tube cap adapter 568, a pullbar socket 450, and a push adapter 480. Threaded pins 452 depicted in FIG. 121 are sized and dimensioned to threadingly engage the pullbar socket 450 and the push adapter 480 and are or may be conventional. As with the first example kit 490 and second example kit 520, the third example kit 550 may include two or more of the tube caps, sleeve removers, and/or push adapters configured for a particular configuration of bushing assembly and housing cavity adapted to accommodate that particular bushing assembly.

Figure 25:
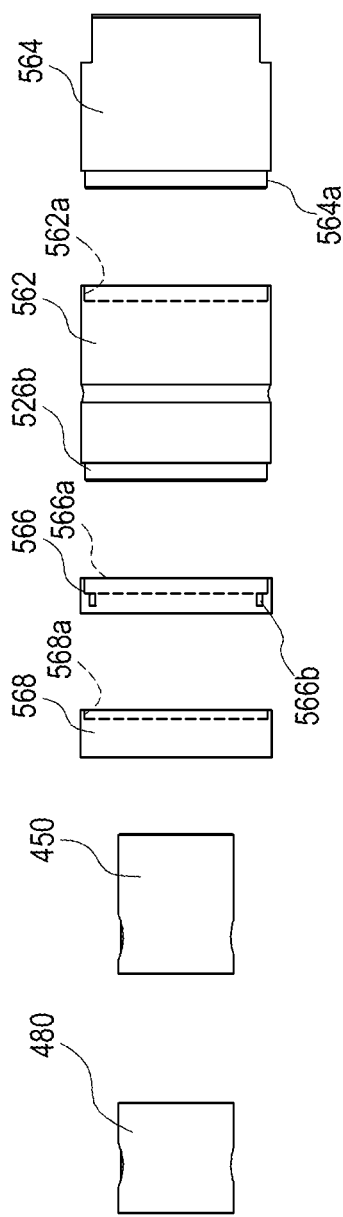
FIG. 25 is side elevation view of the set of components depicted in FIG. 24.
Figure 26:
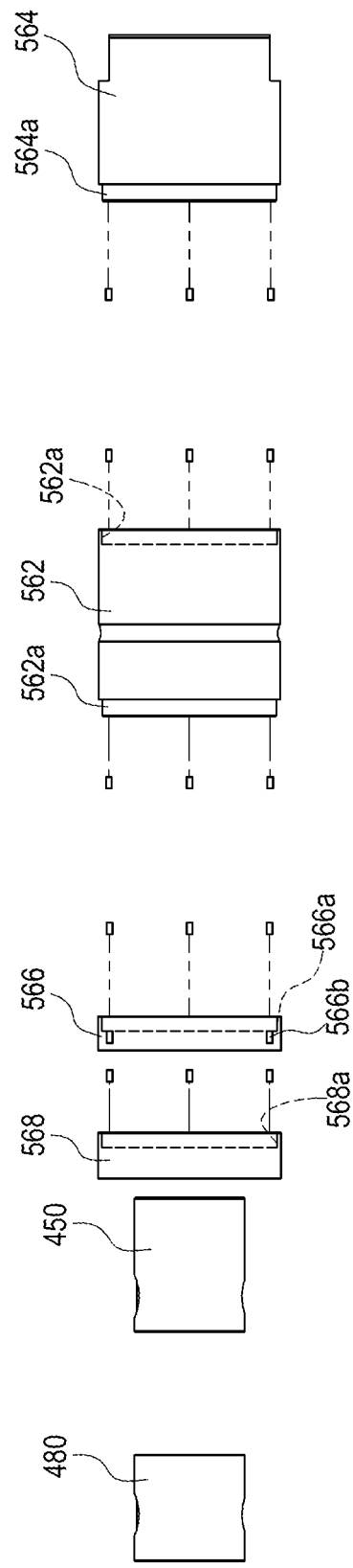
FIG. 26 is side elevation exploded view of the set of components depicted in FIG. 24.

FIGS. 24-26 illustrate that a first engaging surface 564a is formed on the cylinder adapter 564, second and third engaging surfaces 562a and 562b are formed on the cylinder adapter 562, and a fourth engaging surface 566a is formed on the cylinder tube cap 566. The first and second engaging surfaces 564a and 562b are sized and dimensioned to engage each other to allow the cylinder adapter 564 to be supported by the extension tube 562. The third and fourth engaging surfaces 562a and 566a are sized and dimensioned to engage each other to allow cylinder tube cap 566 to be supported by the extension tube 562. The cylinder tube cap 566 further defines a fifth engaging surface 566b. The cylinder tube cap adapter 568 defines a sixth mating surface 568a. The fifth and sixth mating surfaces 566b and 568a are sized and dimensioned to engage each other to allow the cylinder tube cap 566 to support the cylinder tube cap adapter 568.

FIGS. 24 and 26 further illustrate that magnets 470 are supported by at least one, and in the example kit 450, each of the extension tube 562, the cylinder adapter 564, the cylinder tube cap 566, the cylinder tube cap adapter 568, to detachably attach the various components as the kit is being arranged for use.

The third example adapter kit 550 may otherwise be used in the same manner as either of the first example adapter kit 490 and second example adapter kit 520 described above.

What is claimed is:

1. A method of displacing a bushing assembly relative to a housing opening in a structural member, the bushing assembly comprising a bushing rod and a bushing sleeve, the method comprising the steps of:
   providing a drive system comprising an actuator, a threaded rod, and a brace nut,
   operatively connecting a pullbar socket to the threaded rod and the bushing rod;
   arranging a receiver assembly to engage the structural member and the actuator; and
   operating the actuator to displace the brace nut, the threaded rod, and the pullbar socket to remove the bushing rod from the housing assembly;
   operatively connecting a push adapter to the bushing rod; and
   operating the actuator to displace the brace nut, the threaded rod, and the pullbar socket to insert the bushing assembly into the housing opening.

2. A method of displacing a bushing assembly relative to a housing opening in a structural member, the bushing assembly comprising a bushing rod and a bushing sleeve, the method comprising the steps of:
   providing a drive system comprising an actuator, a threaded rod, and a brace nut,
   operatively connecting a pullbar socket to the threaded rod and the bushing rod;
   arranging a receiver assembly to engage the structural member and the actuator;
   operating the actuator to displace the brace nut, the threaded rod, and the pullbar socket to remove the bushing rod from the housing assembly;
   operatively connecting a sleeve remover to the threaded rod; and
   operating the actuator to displace the brace nut, the threaded rod, the pullbar socket, and the sleeve remover to remove the bushing sleeve from the housing opening.

* * * * *